United States Patent
Fang et al.

(10) Patent No.: US 11,595,183 B2
(45) Date of Patent: Feb. 28, 2023

(54) JOINT RESOURCE ASSIGNING METHOD AND DEVICE FOR ALLOCATING RESOURCES TO TERMINAL

(71) Applicant: ZTE Corporation, Shenzhen (CN)

(72) Inventors: Huiying Fang, Shenzhen (CN); Bo Dai, Shenzhen (CN); Weiwei Yang, Shenzhen (CN); Xianming Chen, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 187 days.

(21) Appl. No.: 16/764,697

(22) PCT Filed: Sep. 20, 2018

(86) PCT No.: PCT/CN2018/106806
§ 371 (c)(1),
(2) Date: May 15, 2020

(87) PCT Pub. No.: WO2019/095844
PCT Pub. Date: May 23, 2019

(65) Prior Publication Data
US 2021/0176188 A1  Jun. 10, 2021

(30) Foreign Application Priority Data

Nov. 17, 2017  (CN) .......................... 201711148888.3

(51) Int. Cl.
*H04L 5/00* (2006.01)
*H04W 72/04* (2009.01)
(Continued)

(52) U.S. Cl.
CPC .......... *H04L 5/0094* (2013.01); *H04L 5/0033* (2013.01); *H04L 47/762* (2013.01);
(Continued)

(58) Field of Classification Search
CPC ... H04L 5/0094; H04L 5/0033; H04L 5/0091; H04L 47/762; H04W 72/042;
(Continued)

(56) References Cited

U.S. PATENT DOCUMENTS

2016/0044665 A1  2/2016 Novlan
2017/0245313 A1*  8/2017 Kim ...................... H04L 1/1854
(Continued)

FOREIGN PATENT DOCUMENTS

CN  102238732 A  11/2011
CN  106332286 A  1/2017
(Continued)

OTHER PUBLICATIONS

International Search Report for corresponding application PCT/CN2018/106806 filed on Sep. 20, 2018; dated Dec. 26, 2018.
(Continued)

*Primary Examiner* — Joshua Kading
(74) *Attorney, Agent, or Firm* — Cantor Colburn LLP

(57) ABSTRACT

Provided in the embodiments of the present disclosure are a resource determination and information sending method and device, a storage medium and a processor. The resource determination method includes: receiving configuration information, the configuration information carrying indication information for indicating information of a Physical Resource Block (PRB) that supports resource assignment for a terminal with a subcarrier Resource Unit (RU) as a minimum granularity; receiving information carrying a resource assignment field, a Resource Indication Value (RIV) of a specified field in the resource assignment field being used for indicating resource information assigned to the terminal; and determining, according to the indication information and the RIV, a resource assigned to the terminal.

14 Claims, 4 Drawing Sheets

(51) Int. Cl.
    *H04L 47/762*     (2022.01)
    *H04L 47/78*     (2022.01)
    *H04W 74/08*     (2009.01)
    *H04W 72/0453*     (2023.01)
    *H04W 4/70*     (2018.01)

(52) U.S. Cl.
    CPC ......... *H04L 47/782* (2013.01); *H04W 72/042* (2013.01); *H04W 72/0453* (2013.01); *H04W 72/0493* (2013.01); *H04W 74/0833* (2013.01); *H04W 4/70* (2018.02)

(58) Field of Classification Search
    CPC ......... H04W 72/0453; H04W 72/0493; H04W 4/70; H04W 74/0833
    See application file for complete search history.

(56) References Cited

U.S. PATENT DOCUMENTS

2018/0049203 A1* 2/2018 Xue .................. H04L 5/0053
2018/0192409 A1* 7/2018 Yang ................. H04W 72/044
2018/0220422 A1* 8/2018 Bhattad ............. H04L 5/0039
2019/0150142 A1* 5/2019 Huang .............. H04W 72/0446
    370/336

FOREIGN PATENT DOCUMENTS

CN     106664517 A     5/2017
WO     2007094628 A1     8/2007

OTHER PUBLICATIONS

CATT, "Further discussion on DL Transmission Scheme 2", 3GPP TSG RAN WG1 Meeting #89, Hangzhou China May 15-19, 2017.
European Search Report for corresponding application EP18 879359.0; dated May 3, 2021.
Qualcomm Incorporated, "Increased PUSCH Spectral efficiency". 3GPP TSG-RAN WGI #90bis, May 15-19, 2017.
Qualcomm Incorporated, "Increased PUSCH Spectral efficiency". 3GPP TSG-RAN WGI #90bis, Oct. 9-13, 2017.

* cited by examiner

JOINT RESOURCE ASSIGNING METHOD AND DEVICE FOR ALLOCATING RESOURCES TO TERMINAL

CROSS-REFERENCE TO RELATED APPLICATION

The present application is based upon and claims priority to Chinese Patent Application No. 201711148888.3, filed on Nov. 17, 2017, the entire contents of which are incorporated herein by reference.

TECHNICAL FIELD

The present disclosure relates to the field of communications, and in particular, to a resource determination and information sending method and device, a storage medium, and a processor.

BACKGROUND

Machine Type Communications (MTC), also referred to as Machine to Machine (M2M), is an important application of Internet of Things (IoT). MTC devices typically operate on a Global System of Mobile (GSM) communication system. In recent years, because of improved spectral efficiency of Long Time Evolution (LTE)/Advanced Long Time Evolution (LTE-A), mobile operators have selected LTE/LTE-A to implement future broadband radio communication systems. Consequently, Various MTC data services based on LTE/LTE-A will also improve with this evolution.

For an existing MTC terminal (Rel-13 MTC terminal), a minimum resource assignment granularity for resource assignment of a Physical Uplink Shared Channel (PUSCH) is one Physical Resource Block (PRB), and each PRB is composed of 12 subcarriers in the frequency domain. An uplink resource assignment domain has an overhead of $$\left\lceil \log_2\left(\left\lfloor \frac{N_{RB}^{UL}}{6} \right\rfloor\right) \right\rceil + 5$$

bits in a Coverage Enhanced (CE) mode A and an overhead of $$\left\lceil \log_2\left(\left\lfloor \frac{N_{RB}^{UL}}{6} \right\rfloor\right) \right\rceil + 3$$

bits in a CE mode B. The $N^{UL}_{RB}$ is the number of uplink PRBs. Among various physical channels that support the MTC service, the PUSCH is a bottleneck in coverage. In order to improve the coverage performance and spectral efficiency of the PUSCH, a smaller minimum resource assignment granularity, for example, a Sub-PRB or subcarrier level minimum resource assignment granularity, on the frequency domain is taken into account.

SUMMARY

The embodiments of the present disclosure provide a resource determination and information sending method and device, a storage medium, and a processor, which may at least solve a problem of inflexible resource assignment of a PUSCH channel of MTC in the relevant art.

According to a first embodiment of the present disclosure, a resource determination method is provided, which includes that: configuration information is received, the configuration information includes indication information that provides information of a PRB that supports resource assignment for a terminal with a subcarrier RU as a minimum granularity; information that includes a resource assignment field is received, a Resource Indication Value (RIV) of a specified field in the resource assignment field being used for indicating resource information assigned to the terminal; and a resource assigned to the terminal is determined according to the indication information and the RIV.

According to a second embodiment of the present disclosure, a resource determination method is provided, which includes that: configuration information is sent to a terminal, the configuration information includes indication information that provides information of a PRB that supports resource assignment for the terminal with a subcarrier RU as a minimum granularity; and information that includes a resource assignment field is sent to the terminal, an RIV of a specified field in the resource assignment field being used for indicating resource information assigned to the terminal.

According to a third embodiment of the present disclosure, a resource determination device is provided which includes: a receiving module, configured to receive configuration information, the configuration information includes indication information that provides information of a PRB that supports resource assignment for a terminal with a subcarrier RU as a minimum granularity; and further configured to receive information that includes a resource assignment field, an RIV of a specified field in the resource assignment field being used for indicating resource information assigned to the terminal; and a determination module, configured to determine, according to the indication information and the RIV, a resource assigned to the terminal.

According to a fourth embodiment of the present disclosure, an information sending device is provided, which includes: a sending module, configured to send configuration information to a terminal, the configuration information includes indication information that provides information of a PRB that supports resource assignment for the terminal with a subcarrier RU as a minimum granularity; and further configured to send information carrying a resource assignment field to the terminal, an RIV of a specified field in the resource assignment field being used for indicating resource information assigned to the terminal.

According to a fifth embodiment of the present disclosure, a storage medium is further provided; the storage medium includes a stored program; and the program executes, when running, the resource determination method in the embodiment of the present disclosure; or the program executes, when running, the information sending method in the embodiment of the present disclosure.

According to a sixth embodiment of the present disclosure, a processor is further provided; the processor is configured to run a program; and the program executes, when running, the resource determination method in the embodiment of the present disclosure; or the program executes, when running, the information sending method in the embodiment of the present disclosure.

According to a seventh embodiment of the present disclosure, a resource determination device is further provided, which includes: a processor and a memory configured to store a computer program capable of running on the processor; and the processor executes, when being configured to run the computer program, the resource determination method in the embodiment of the present disclosure.

According to an eighth embodiment of the present disclosure, an information sending device is further provided, which includes: a processor and a memory configured to store a computer program capable of running on the processor; and the processor executes, when being configured to run the computer program, the information sending method in the embodiment of the present disclosure.

Through the embodiments of the present disclosure, a resource assigned to a terminal is determined according to indication information for indicating information of a PRB that supports resource assignment for the terminal with a subcarrier RU as a minimum granularity and an RIV for indicating resource information assigned to the terminal, that is, joint resource assignment in which the resource is assigned for the terminal with the PRB as the minimum granularity and the subcarrier RU as the minimum granularity is implemented based on the indication information and the RIV, so that the flexibility for resource assignment is increased; and therefore, a problem of inflexible resource assignment of a PUSCH channel of MTC in the relevant art may be solved.

BRIEF DESCRIPTION OF THE DRAWINGS

The accompanying drawings are described here to provide a further understanding of the present disclosure, and form a part of the present disclosure. The schematic embodiments and description of the present disclosure are adapted to explain the present disclosure, and do not form improper limits to the present disclosure. In the drawings.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It is to be noted that terms such as "first" and "second" in the specification, claims, and accompanying drawings of the present disclosure are only used to distinguish similar objects and are unnecessary to describe a special order or a precedence order.

Presently, an effective solution is called for to improve the Physical Uplink Shared Channel (PUSCH) channel of the Machine Type Communications (MTC) to solve a problem of flexible resource assignment based on the Physical Resource Block (PRB) resource assignment granularity and Sub-PRB resource assignment granularity (that is, a subcarrier resource assignment granularity, assignment according to an assignment granularity of a subcarrier Resource Unit (RU)). Embodiments described in the present disclosure address such a technical problem.

Embodiment 1

Figure 1:
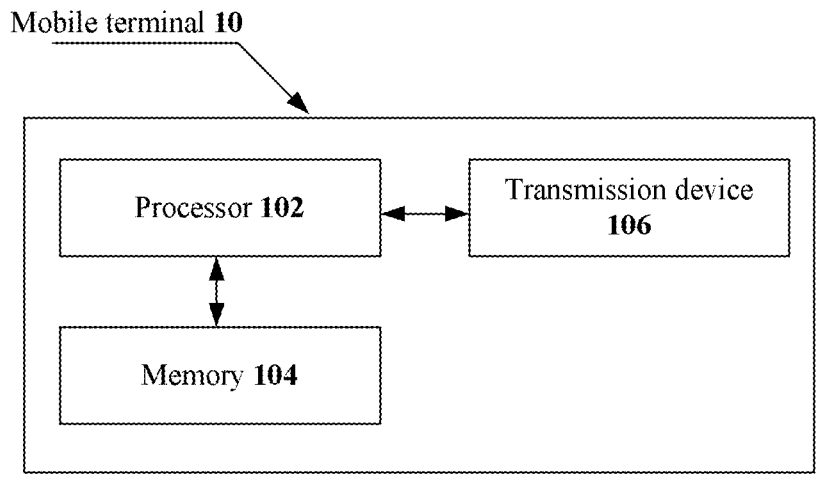
FIG. 1 illustrates a block diagram of a hardware structure of a mobile terminal for a resource determination method provided by an embodiment of the present disclosure.

The method embodiment provided by an Embodiment 1 of the present disclosure may be executed in a mobile terminal, a computer terminal, or a similar operation device. For example, the method embodiment may run on the mobile terminal. FIG. 1 illustrates a block diagram of a hardware structure of a mobile terminal for a resource determination method provided by an embodiment of the present disclosure. As shown in FIG. 1, the mobile terminal 10 may include one or more (only one is shown in the figure) processors 102 (the processor 102 may include but not limited to a processing device such as a Microcontroller Unit (MCU) or a Field Programmable Gate Array (FPGA)), a memory 104 configured to store data, and a transmission device 106 for a communication function. Those of ordinary skill in the art may understand that the structure shown in FIG. 1 is merely for illustration, rather than a limit to the above structure of the electronic device. For example, the mobile terminal 10 may further include more or fewer components than those shown in FIG. 1, or have a configuration different from FIG. 1.

The memory 104 may be configured to store a software program and a module of application software, such as a program instruction/module corresponding to the resource determination method in the embodiments of the present disclosure. The processor 102 executes, by running the software program and the module stored in the memory 104, various functional applications as well as data processing, that is, implementation of the above method. The memory 104 may include a high-speed Random Access Memory (RAM), and may further include non-volatile memory such as one or more magnetic storage devices, flash memory or other non-volatile solid-state memories. In some examples, memory 104 may further include a memory remotely disposed relative to the processor 102; and these remote memories may be connected to the mobile terminal 10 via a network. An example of the network includes but not limited to the Internet, an intranet, a local area network, a mobile communication network, and a combination thereof.

The transmission device 106 is configured to receive or transmit data via one network. A specific example of the network may include a wireless network provided by a communication supplier of the mobile terminal 10. In an example, the transmission device 106 includes a network adapter (e.g., a Network Interface Controller (NIC)) that may be connected to other network devices via an Evolved Node B (eNB) to communicate with the Internet. In an example, the transmission device 106 may be a Radio Frequency (RF) module that is configured to communicate with the Internet in a wireless manner.

Figure 2:
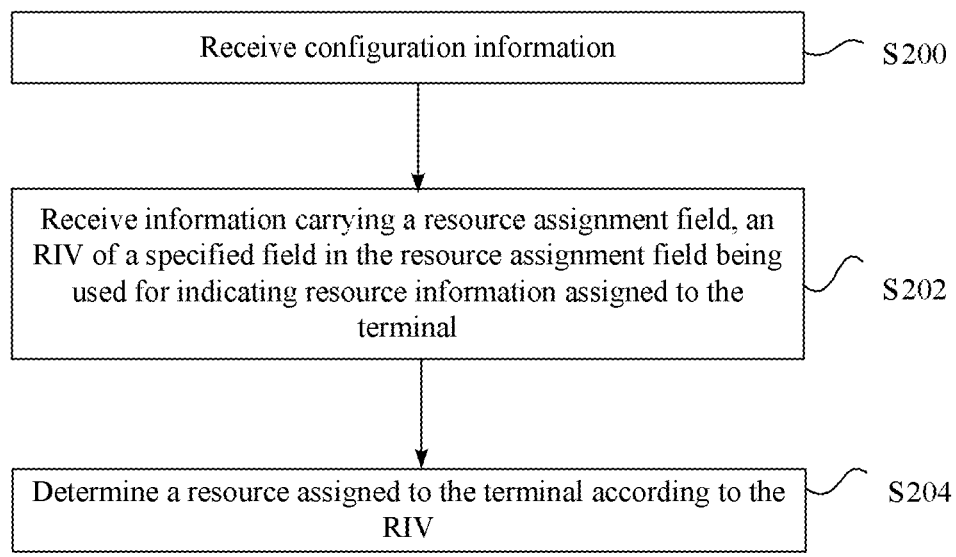
FIG. 2 illustrates a flowchart of a resource determination method provided by an embodiment of the present disclosure.

This embodiment provides a resource determination method that runs in the mobile terminal. FIG. 2 illustrates a flowchart of a resource determination method provided by an embodiment of the present disclosure. As shown in FIG. 2, the process includes the following operations.

In operation 200, configuration information is received. The configuration information includes indication information that provides information of a PRB that supports resource assignment for a terminal with a subcarrier RU as a minimum granularity.

In operation 202, information carrying a resource assignment field is received. A Resource Indication Value (RIV) of a specified field in the resource assignment field is used for indicating resource information assigned to the terminal.

In operation 204, a resource assigned to the terminal is determined according to the indication information and the RIV.

In an embodiment, when the RIV of the specified field falls into a first domain, the minimum granularity of the resource assigned to the terminal is the PRB; and when the RIV of the specified field falls into a second domain, the minimum granularity of the resource assigned to the terminal is the subcarrier RU.

In this embodiment, the indication information is used for indicating which PRB supports the resource assignment for the terminal with the subcarrier RU as the minimum granularity. It is to be noted that the configuration information may also carry indication information for indicating information of a PRB that does not support the resource assignment for the terminal with the subcarrier RU as the minimum granularity. The embodiment is not limited to be implemented in this exemplary implementation manner.

Through the above operations, a resource assigned to a terminal is determined according to indication information that provides information of a PRB that supports resource assignment for the terminal with a subcarrier RU as a minimum granularity and an RIV for indicating resource information assigned to the terminal, that is, joint resource assignment in which the resource is assigned for the terminal with the PRB as the minimum granularity and the subcarrier RU as the minimum granularity is implemented based on the indication information and the RIV, so that the flexibility for resource assignment is increased; and accordingly, a problem of inflexible resource assignment of a PUSCH channel of MTC in the relevant art may be solved.

It is to be noted that the specified field has a length of X bits. In the case of a CE mode A, X is one of the following: 2, 3, 4, 5, 6, 7, and 8. In the case of a CE mode B, X is one of the following: 1, 2, 3, 4, 5, and 6.

It is to be noted that X meets the following condition: $M+N\times P\times S \leq 2^X$, where M denotes the number of resource assignment types under which resources are assigned to the terminal with the PRB as the minimum granularity, N denotes the number of PRBs that support resource assignment for the terminal with the subcarrier RU as the minimum granularity, P denotes the number of types of subcarrier RUs, and S denotes the number of types for the number of subcarrier RUs.

For example, if the number of subcarrier RUs is 1 or 2 or 4, there are 3 types for the number of subcarrier RUs, that is, in the above example, S should be 3. However, the example is not limited thereto.

It is to be noted that when the RIV falls into a second domain, the resource information may include at least one of the following: a PRB where the subcarrier RU assigned to the terminal is located, a type of the subcarrier RU assigned to the terminal, and a number of subcarrier RUs under the type of the subcarrier RU assigned to the terminal.

In an embodiment of the present disclosure, the information of the PRB that supports the resource assignment with the subcarrier RU as the minimum granularity is configured via Radio Resource Control (RRC) signaling.

In another embodiment of the present disclosure, the information of the PRB that supports the resource assignment with the subcarrier RU as the minimum granularity is a serial number of a physical resource element in a narrow band.

It is to be noted that the configuration information may be pre-defined or configured via RRC signaling (such as a system message or user-specific RRC signaling), and the like but is not limited thereto.

It is to be noted that in a case where the minimum granularity of the resource assigned to the terminal is the subcarrier RU, the RIV includes one of the following: index value for a type of the subcarrier RU+index value of the PRB*total number of states for the type of the subcarrier RU+index value for the number of subcarrier RUs*total number of states for the index value of the PRB*total number of states for the type of the subcarrier RU; index value for a type of the subcarrier RU+index value for the number of subcarrier RUs*total number of states for the type of the subcarrier RU+index value of the PRB*total number of states for a number index of the subcarrier RU*total number of states for the type of the subcarrier RU; index value of the PRB+index value for the type of the subcarrier RU*total number of states for the index value of the PRB+index value for the number of subcarrier RUs*total number of states for the index value of the PRB*total number of states of the index value for the type of the subcarrier RU; index value of the PRB+index value for the number of subcarrier RUs*total number of states for the index value of the PRB+index value for a type of the subcarrier RU*total number of states for the index value of the PRB*total number of states of the index value for the number of subcarrier RUs; index value for the number of subcarrier RUs+index value for a type of the subcarrier RU*total number of states for the number of subcarrier RUs+index value of the PRB*total number of states for the number of subcarrier RUs*total number of states of the index value for the number of subcarrier RUs; index value for the number of subcarrier RUs+index value of the PRB*total number of states for the number of subcarrier RUs+index value for a type of the subcarrier RU*total number of states of the index value for the number of subcarrier RUs*total number of states for the index value of the PRB; Q+index value for a type of the subcarrier RU+index value of the PRB*total number of states for the type of the subcarrier RU+index value for the number of subcarrier RUs*total number of states for the index value of the PRB*total number of states for the type of the subcarrier RU; Q+index value of the PRB+index value for the type of the subcarrier RU*total number of states for the index value of the subcarrier RU+index value for the number of subcarrier RUs*total number of states for the index value of the PRB*total number of states of the index value for the type of the subcarrier RU; Q+index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; Q+index value for a type of the subcarrier RU+index value for the number of subcarrier RUs*total number of states for the type of subcarrier RU+index value of the PRB*total number of states of the index value for the number of subcarrier RUs*total number of states for the type of the subcarrier RU; Q+index value of the PRB+index value for the number of subcarrier RUs*total number of states for the index value of the PRB+index value for a type of the subcarrier RU*total number of states for the index value of the PRB*total number of states of the index value for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and the Q is a positive integer.

In an exemplary embodiment, Q is 21 or 20 but is not limited thereto.

It is to be noted that the "+" is an addition operator, and the "*" is a multiplication operator.

It is to be noted that the total number of states may be considered to be a number. The total number of states for the type of the subcarrier RU is used as an example for description, and the total number of states for the type of the subcarrier RU is the number of types of subcarrier RUs but is not limited thereto.

In an embodiment of the present disclosure, before the operation S202, the method may further include determining a resource assignment solution used when the resource assignment is performed on the terminal. In a case were the resource assignment solution is determined as a joint resource assignment of performing the resource assignment with the PRB as the minimum granulanty and the subcarrier RU as the minimum granularity, the information is received.

It is to be noted that the operation that a resource assignment solution used when the resource assignment is performed on the terminal is determined may be implemented as follows: when the terminal sends a message Msg3 for scheduling a random access response message, the resource assignment solution is determined as a solution of performing the resource assignment with the PRB as the minimum granularity; in a case where a random access process the terminal uses for performing random access is a competitive random access process, or in a case where the random access process the terminal uses for performing random access is a non-competitive random access process and the joint resource assignment is not configured in the random access process, the resource assignment solution for retransmission of an uplink (UL) grant scheduling Msg3 is determined as a solution of performing the resource assignment with the PRB as the minimum granularity; and in a case where the random access process the terminal uses for performing random access is the non-competitive random access process and the joint resource assignment is configured in the random access process, the resource assignment solution for retransmission of an UL grant scheduling Msg3 is determined as the joint resource assignment of performing the resource assignment with the PRB as the minimum granularity and the subcarrier RU as the minimum granularity.

It is to be noted that an executor of the above operations may be, but is not limited to be, a terminal.

This embodiment of the present disclosure further provides an information sending method, which includes: sending configuration information to a terminal. The configuration information carries indication information that provides information of a PRB that supports resource assignment for the terminal with a subcarrier RU as a minimum granularity. The method also includes sending information carrying a resource assignment field to the terminal. An RIV of a specified field in the resource assignment field is used for indicating resource information assigned to the terminal.

In an embodiment, when the RIV of the specified field falls into a first domain, the minimum granularity of the resource assigned to the terminal is the PRB; and when the RIV of the specified field falls into a second domain, the minimum granularity of the resource assigned to the terminal is the subcarrier RU.

In an embodiment, the configuration information may also carry indication information for indicating information of a PRB that does not support the resource assignment for the terminal with the subcarrier RU as the minimum granularity.

Through the above operations, a resource assigned to a terminal is determined according to indication information for indicating information of a PRB that supports resource assignment for the terminal with a subcarrier RU as a minimum granularity and an RIV for indicating resource information assigned to the terminal, that is, joint resource assignment in which the resource is assigned for the terminal with the PRB as the minimum granularity and the subcarrier RU as the minimum granularity is implemented based on the indication information and the RIV, so that the flexibility for resource assignment is increased; and accordingly, a problem of inflexible resource assignment of a PUSCH channel of MTC in the relevant art may be solved.

It is to be noted that the specified field has a length of X bits. In the case of a CE mode A, X is one of the following: 2, 3, 4, 5, 6, 7, and 8. In the case of a CE mode B, X is one of the following: 1, 2, 3, 4, 5, and 6.

It is to be noted that X meets the following condition: $M+N \times P \times S \leq 2^X$, where M denotes the number of resource assignment types under which resources are assigned to the terminal with the PRB as the minimum granularity, N denotes the number of PRBs that support resource assignment for the terminal with the subcarrier RU as the minimum granularity, the P denotes the number of types of subcarrier RUs, and S denotes the number of types for the number of subcarrier RUs.

For example, if the number of subcarrier RUs is 1 or 2 or 4, there are 3 types for the number of subcarrier RUs, that is, in the above example, S should be 3. However, the example is not limited thereto.

It is to be noted that when the RIV falls into a second domain, the resource information may include at least one of the followings: a PRB where the subcarrier RU assigned to the terminal is located, a type of the subcarrier RU assigned to the terminal, and a number of subcarrier RUs under the type of the subcarrier RU assigned to the terminal.

In an embodiment of the present disclosure, the information of the PRB that supports the resource assignment with the subcarrier RU as the minimum granularity is configured via RRC signaling.

In another embodiment of the present disclosure, the information of the PRB that supports the resource assignment with the subcarrier RU as the minimum granularity is a serial number of a physical resource element in a narrow band.

It is to be noted that the configuration information may be pre-defined or configured via RRC signaling (such as a system message or user-specific RRC signaling), and the like but is not limited thereto.

It is to be noted that in a case where the minimum granularity of the resource assigned to the terminal is the subcarrier RU, the RIV includes one of the following: index value for a type of the subcarrier RU+index value of the PRB*total number of states for the type of the subcarrier RU+index value for the number of subcarrier RUs*total number of states for the index value of the PRB*total number of states for the type of the subcarrier RU; index value for a type of the subcarrier RU+index value for the number of subcarrier RUs*total number of states for the type of the subcarrier RU+index value of the PRB*total number of states for a number index of the subcarrier RU*total number of states for the type of the subcarrier RU; index value of the PRB+index value for the type of the subcarrier RU*total number of states for the index value of the PRB+ index value for the number of subcarrier RUs*total number of states for the index value of the PRB*total number of states of the index value for the type of the subcarrier RU; index value of the PRB+index value for the number of subcarrier RUs*total number of states for the index value of the PRB+index value for a type of the subcarrier RU*total number of states for the index value of the PRB*total number of states of the index value for the number of subcarrier RUs; index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; index value for the number of subcarrier RUs+index value of the PRB*total number of states for the number of subcarrier RUs+index value for a type of the subcarrier RU*total number of states for the number of subcarrier RUs*total number of states for the index value of the PRB; Q+index value for a type of the subcarrier RU+index value of the PRB*total number of states for the type of the subcarrier RU+index value for the number of subcarrier RUs*total number of states for the index value of the PRB*total number of states for the type of the subcarrier RU; Q+index value of the PRB+index value for the type of the subcarrier RU*total number of states for the index value of the subcarrier RU+index value for the number of subcarrier RUs*total number of states for the index value of the PRB*total number of states of the index value for the type of the subcarrier RU; Q+index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; Q+index value for a type of the subcarrier RU+index value for the number of subcarrier RUs*total number of states for the type of subcarrier RU+index value of the PRB*total number of states of the index value for the number of subcarrier RUs*total number of states for the type of the subcarrier RU; Q+index value of the PRB+index value for the number of subcarrier RUs*total number of states for the index value of the PRB+index value for a type of the subcarrier RU*total number of states for the index value of the PRB*total number of states of the index value for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and the Q is a positive integer.

In an exemplary embodiment, Q is 21 or 20 but is not limited thereto.

It is to be noted that the "+" is an addition operator, and the "*" is a multiplication operator.

It is to be noted that the total number of states may be considered to be a number. The total number of states for the type of the subcarrier RU is used as an example for description, and the total number of states for the type of the subcarrier RU is the number of types of subcarrier RUs but is not limited thereto.

It is to be noted that an executor of the above information sending method may be a network side device such as an eNB but is not limited thereto.

By means of the above-mentioned descriptions on the implementation manner, the person skilled in the art may clearly understand that the present disclosure may be implemented by software plus a universal hardware platform, and may also be implemented by hardware, but under most conditions, the former is a better implementation manner. Based on such an understanding, the technical solutions of the present disclosure essentially, or the part contributing to the conventional art may be implemented as a computer program product. The computer program product can be stored in a storage medium (such as ROM/RAM, a magnetic disk, and an optical disc) and can include instructions for instructing a terminal device (which may be a mobile phone, a computer, a server, or a network device, etc.) to execute the methods described in the embodiments of the present disclosure.

Embodiment 2

This embodiment further provides a resource determination device for implementing the above-mentioned embodiments and exemplary implementation manners. Content that has been described elsewhere in this disclosure is not repeated for compactness. As used herein, the term "module" may implement a combination of software and/or hardware having a predetermined function.

Figure 3:
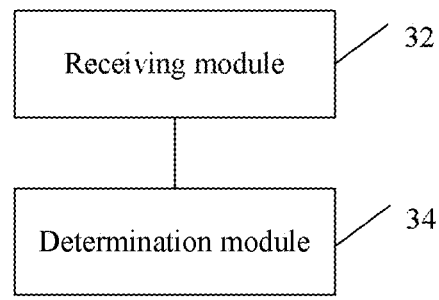
FIG. 3 illustrates a structural block diagram of a resource determination device provided by an embodiment of the present disclosure.

FIG. 3 illustrates a structural block diagram of a resource determination device provided by an embodiment of the present disclosure. As shown in FIG. 3, the device includes a receiving module 32 and a determination module 34.

The receiving module 32 is configured to receive configuration information. The configuration information includes indication information for providing information of a PRB that supports resource assignment for a terminal with a subcarrier RU as a minimum granularity. The receiving module 32 is further configured to receive information carrying a resource assignment field, an RIV of a specified field in the resource assignment field being used for indicating resource information assigned to the terminal.

The determination module 34 is connected to the receiving module 32, and is configured to determine, according to the indication information and the RIV, a resource assigned to the terminal.

In an embodiment, when the RIV of the specified field falls into a first domain, the minimum granularity of the resource assigned to the terminal is the PRB; and when the RIV of the specified field falls into a second domain, the minimum granularity of the resource assigned to the terminal is the subcarrier RU.

In this embodiment, the indication information is used for indicating which PRB supports the resource assignment for the terminal with the subcarrier RU as the minimum granularity. It is to be noted that the configuration information may also carry indication information for indicating information of a PRB that does not support the resource assignment for the terminal with the subcarrier RU as the minimum granularity but is not limited thereto.

Through the above device, a resource assigned to a terminal is determined according to indication information that provides information of a PRB that supports resource assignment for the terminal with a subcarrier RU as a minimum granularity and an RIV for indicating resource information assigned to the terminal, that is, joint resource assignment in which the resource is assigned for the terminal with the PRB as the minimum granularity and the subcarrier RU as the minimum granularity is implemented based on the indication information and the RIV, so that the flexibility for resource assignment is increased; and therefore, a problem of inflexible resource assignment of a PUSCH channel of MTC in the relevant art may be solved.

It is to be noted that the specified field has a length of X bits. In the case of a CE mode A, X is one of the following: 2, 3, 4, 5, 6, 7, and 8. In case of a CE mode B, X is one of the following: 1, 2, 3, 4, 5, and 6.

It is to be noted that X meets the following condition: $M+N\times P\times S\leq 2^X$, where M denotes the number of resource assignment types under which resources are assigned to the terminal with the PRB as the minimum granularity, the N denotes the number of PRBs that support resource assignment for the terminal with the subcarrier RU as the minimum granularity, P denotes the number of types of subcarrier RUs, and S denotes the number of types for the number of subcarrier RUs.

For example, if the number of subcarrier RUs is 1 or 2 or 4, there are 3 types for the number of subcarrier RUs, that is, in the above example, S should be 3. However, the example is not limited thereto.

It is to be noted that when the RIV falls into a second domain, the resource information may include at least one of the following: a PRB where the subcarrier RU assigned to the terminal is located, a type of the subcarrier RU assigned to the terminal, and a number of subcarrier RUs under the type of the subcarrier RU assigned to the terminal.

In an embodiment of the present disclosure, the information of the PRB that supports the resource assignment with the subcarrier RU as the minimum granularity is configured via RRC signaling.

In another embodiment of the present disclosure, the information of the PRB that supports the resource assignment with the subcarrier RU as the minimum granularity is a serial number of a physical resource element in a narrow band.

It is to be noted that the configuration information may be pre-defined or configured via RRC signaling (such as a system message or user-specific RRC signaling), and the like but is not limited thereto.

It is to be noted that in a case where the minimum granularity of the resource assigned to the terminal is the subcarrier RU, the RIV includes one of the following: index value for a type of the subcarrier RU+index value of the PRB*total number of states for the type of the subcarrier RU+index value for the number of subcarrier RUs*total number of states for the type of the PRB*total number of states for the type of the subcarrier RU; index value for a type of the subcarrier RU+index value for the number of subcarrier RUs*total number of states for the type of the subcarrier RU+index value of the PRB*total number of states for a number index of the subcarrier RU*total number of states for the type of the subcarrier RU; index value of the PRB+index value for the type of the subcarrier RU*total number of states for the index value of the PRB+index value for the number of subcarrier RUs*total number of states for the index value of the PRB*total number of states of the index value for the type of the subcarrier RU; index value of the PRB+index value for the number of subcarrier RUs*total number of states for the index value of the PRB+index value for a type of the subcarrier RU*total number of states for the index value of the PRB*total number of states of the index value for the number of subcarrier RUs; index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; index value for the number of subcarrier RUs+index value of the PRB*total number of states for the number of subcarrier RUs+index value for a type of the subcarrier RU*total number of states for the number of subcarrier RUs*total number of states for the index value of the PRB; Q+index value for a type of the subcarrier RU+index value of the PRB*total number of states for the type of the subcarrier RU+index value for the number of subcarrier RUs*total number of states for the index value of the PRB*total number of states for the type of the subcarrier RU; Q+index value of the PRB+index value for the type of the subcarrier RU*total number of states for the index value of the subcarrier RU+index value for the number of subcarrier RUs*total number of states for the index value of the PRB*total number of states of the index value for the type of the subcarrier RU; Q+index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; Q+index value for a type of the subcarrier RU+index value for the number of subcarrier RUs*total number of states for the type of subcarrier RU+index value of the PRB*total number of states of the index value for the number of subcarrier RUs*total number of states for the type of the subcarrier RU; Q+index value of the PRB+index value for the number of subcarrier RUs*total number of states for the index value of the PRB+index value for a type of the subcarrier RU*total number of states for the index value of the PRB*total number of states of the index value for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and Q is a positive integer.

In an exemplary embodiment, Q is 21 or 20 but is not limited thereto.

It is to be noted that the "+" is an addition operator and the "*" is a multiplication operator.

It is to be noted that the total number of states may be considered to be a number. The total number of states for the type of the subcarrier RU is used as an example for description, and the total number of states for the type of the subcarrier RU is the number of types of subcarrier RUs but is not limited thereto.

In an embodiment of the present disclosure, the determination module 34 is further configured to determine a resource assignment solution used when the resource assignment is performed on the terminal. In a case where the resource assignment solution is determined as joint resource assignment of performing the resource assignment with the PRB as the minimum granularity and the subcarrier RU as the minimum granularity, the information is received.

It is to be noted that the determined resource assignment solution used when the resource assignment is performed on the terminal may be implemented as follows: when the terminal sends a message Msg3 for scheduling a random access response message, the resource assignment solution is determined as a solution of performing the resource assignment with the PRB as the minimum granularity; in a case where a random access process that the terminal uses is a competitive random access process, or in a case where the random access process that the terminal uses for performing random access is a non-competitive random access process and the joint resource assignment is not configured in the random access process, the resource assignment solution for retransmission of an UL grant scheduling Msg3 is determined as a solution of performing the resource assignment with the PRB as the minimum granularity; and in a case where the random access process that the terminal uses is the non-competitive random access process and the joint resource assignment is configured in the random access process, the resource assignment solution for retransmission of an UL grant scheduling Msg3 is determined as the joint resource assignment of performing the resource assignment with the PRB as the minimum granularity and the subcarrier RU as the minimum granularity.

It is to be noted that the device may be located in a terminal but is not limited thereto.

It is to be noted that each module may be implemented by software or hardware. The later may be implemented based on the following manner but is not limited thereto: the above modules are located in the same processor; or the above modules are respectively located in different processors in any combined form.

An embodiment of the present disclosure further provides an information sending device, which includes: a sending module, configured to send configuration information to a terminal, the configuration information includes indication information that provides information of a PRB that supports resource assignment for the terminal with a subcarrier RU as a minimum granularity, and the sending module is further configured to send information carrying a resource assignment field to the terminal, and an RIV of a specified field in the resource assignment field being used for indicating resource information assigned to the terminal.

In an embodiment, when the RIV of the specified field falls into a first domain, the minimum granularity of the resource assigned to the terminal is the PRB; and when the RIV of the specified field falls into a second domain, the minimum granularity of the resource assigned to the terminal is the subcarrier RU.

In an embodiment, the configuration information may also carry indication information for indicating information of a PRB that does not support the resource assignment for the terminal with the subcarrier RU as the minimum granularity.

Through the above device, a resource assigned to a terminal is determined according to indication information for indicating information of a PRB that supports resource assignment for the terminal with a subcarrier RU as a minimum granularity and an RIV for indicating resource information assigned to the terminal, that is, joint resource assignment in which the resource is assigned for the terminal with the PRB as the minimum granularity and the subcarrier RU as the minimum granularity is implemented based on the indication information and the RIV, so that the flexibility for resource assignment is increased; and accordingly, a problem of inflexible resource assignment of a PUSCH channel of MTC in the relevant art may be solved.

It is to be noted that the specified field has a length of X bits. In the case of a CE mode A, the X is one of the following: 2, 3, 4, 5, 6, 7, and 8. In the case of a CE mode B, the X is one of the following: 1, 2, 3, 4, 5, and 6.

It is to be noted that the X meets the following condition: $M+N \times P \times S \leq 2^X$, where M denotes the number of resource assignment types under which resources are assigned to the terminal with the PRB as the minimum granularity, N denotes number of PRBs that support resource assignment for the terminal with the subcarrier RU as the minimum granularity. P denotes the number of types of subcarrier RUs. and S denotes the number of types for the number of subcarrier RUs.

For example, if the number of subcarrier RUs is 1 or 2 or 4, there are 3 types for the number of subcarrier RUs, that is, in the above example, S should be 3. However, the example is not limited thereto.

It is to be noted that when the RIV falls into a second domain, the resource information may include at least one of the followings: a PRB where the subcarrier RU assigned to the terminal is located, a type of the subcarrier RU assigned to the terminal, and a number of subcarrier RUs under the type of the subcarrier RU assigned to the terminal.

In an embodiment of the present disclosure, the information of the PRB that supports the resource assignment with the subcarrier RU as the minimum granularity is configured via RRC signaling.

In another embodiment of the present disclosure, the information of the PRB that supports the resource assignment with the subcarrier RU as the minimum granularity is a serial number of a physical resource element in a narrow band.

It is to be noted that the configuration information may be pre-defined or configured via RRC signaling (such as a system message or user-specific RRC signaling), and the like but is not limited thereto.

It is to be noted that in a case where the minimum granularity of the resource assigned to the terminal is the subcarrier RU, the RIV includes one of the followings: index value for a type of the subcarrier RU+index value of the PRB*total number of states for the type of the subcarrier RU+index value for the number of subcarrier RUs*total number of states for the index value of the PRB*total number of states for the type of the subcarrier RU; index value for a type of the subcarrier RU+index value for the number of subcarrier RUs*total number of states for the type of the subcarrier RU+index value of the PRB*total number of states for a number index of the subcarrier RU*total number of states for the type of the subcarrier RU; index value of the PRB+index value for the type of the subcarrier RU*total number of states for the index value of the PRB+ index value for the number of subcarrier RUs*total number of states for the index value of the PRB*total number of states of the index value for the type of the subcarrier RU; index value of the PRB+index value for the number of subcarrier RUs*total number of states for the index value of the PRB+index value for a type of the subcarrier RU*total number of states for the index value of the PRB*total number of states of the index value for the number of subcarrier RUs; index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; index value for the number of subcarrier RUs+index value of the PRB*total number of states for the number of subcarrier RUs+index value for a type of the subcarrier RU*total number of states for the number of subcarrier RUs*total number of states for the index value of the PRB; Q+index value for a type of the subcarrier RU+index value of the PRB*total number of states for the type of the subcarrier RU+index value for the number of subcarrier RUs*total number of states for the index value of the PRB*total number of states for the type of the subcarrier RU; Q+index value of the PRB+index value for the type of the subcarrier RU*total number of states for the index value of the subcarrier RU+index value for the number of subcarrier RUs*total number of states for the index value of the PRB*total number of states of the index value for the type of the subcarrier RU; Q+index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU; Q+index value for a type of the subcarrier RU+index value for the number of subcarrier RUs*total number of states for the type of subcarrier RU+index value of the PRB*total number of states of the index value for the number of subcarrier RUs*total number of states for the type of the subcarrier RU; Q+index value of the PRB+index value for the number of subcarrier RUs*total number of states for the index value of the PRB+index value for a type of the subcarrier RU*total number of states for the index value of the PRB*total number of states of the index value for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and Q is a positive integer.

In an exemplary embodiment, Q is 21 or 20 but is not limited thereto.

It is to be noted that the "+" is an addition operator and the "*" is a multiplication operator.

It is to be noted that the total number of states may be considered to be a number. The total number of states for the type of the subcarrier RU is used as an example for description, and the total number of states for the type of the subcarrier RU is the number of types of subcarrier RUs but is not limited thereto.

It is to be noted that the information sending device may be, but is not limited to be, located in a network side device such as an eNB.

It is to be noted that each module may be implemented by software or hardware. The later may be, but is not limited to be, implemented via the following manner: the above modules are located in the same processor; or the above modules are respectively located in different processors in any combined form.

Embodiment 3

This embodiment of the present disclosure further provides a storage medium. The storage medium includes a stored program, and the program executes, when running, any resource determination method in the above embodiments of the present disclosure; or the program executes, when running, any information sending method in the above embodiments of the present disclosure.

In at least one implementation of this embodiment, the storage medium may include but is not limited to: various media capable of storing a program code such as a U disk, an ROM, an RAM, a mobile hard disk, a magnetic disk or an optical disc.

This embodiment of the present disclosure further provides a processor. The processor is configured to run a program. The program executes, when running, any resource determination method in the above embodiments of the present disclosure; or the program executes, when running, any information sending method in the above embodiments of the present disclosure.

This embodiment of the present disclosure further provides a resource determination device, which includes: a processor and a memory configured to store a computer program capable of running on the processor; and the processor executes, when being configured to run the computer program, the operations of any resource determination method in the above embodiments of the present disclosure.

This embodiment of the present disclosure further provides an information sending device, which includes: a processor and a memory configured to store a computer program capable of running on the processor; and the processor executes, when being configured to run the computer program, the operations of any information sending method in the above embodiments of the present disclosure.

This embodiment may be implemented using modules and methods described herein, which are not repeated for compactness.

In order to better understand the embodiments of the present disclosure, the embodiments of the present disclosure are further explained in combination with exemplary embodiments.

A method provided by the exemplary embodiments of the present disclosure includes the following operations.

(1) In a CE mode A, joint resource assignment at a PRB resource assignment granularity and a Sub-PRB resource assignment granularity in a narrow band is indicated via X bits, wherein the X=5 or 6 or 7 or 8.

A resource assignment field having a length of X bits in the narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs in the narrow band as well as the resource assignment of subcarrier RUs in all or a part of PRBs in the narrow band. Supposing that the number of types that can support the PRB level resource assignment is M (M has a maximum value of 21, and is equivalent to M in the above embodiments), the number of PRBs that can support the Sub-PRB level resource assignment is N (N has a maximum value of 6, and is equivalent to N in the above embodiments), the number of types of subcarrier RUs is P (P is greater than or equal to 2 and smaller than or equal to 16, and is equivalent to P in the above embodiments), and the number of types of subcarrier RUs is S (S is 1 or 2 or 3 or 4 or 6, and is equivalent to S in the above embodiments), then $M+N*P*S \leq 2^X$.

In some exemplary implementation, the PRB level (which is equivalent to that the PRB is the minimum granularity) resource assignment or the Sub-PRB level (which is equivalent to the joint resource assignment) resource assignment are defined in a part of PRBs by pre-defined configuration or RRC signaling (a system message or user-specific RRC signaling) configuration.

(2) In a CE mode B, the joint resource assignment at the PRB resource assignment granularity and the Sub-PRB resource assignment granularity in the narrow band is indicated via Y bits, wherein Y=3 or 4 or 5 or 6.

A resource assignment field having a length of Y bits in the narrow band is used to indicate the resource assignment at the PRB level resource assignment granularity and the Sub-PRB level resource assignment granularity in the narrow band, so as to support the resource assignment of a part of PRBs in the narrow band and the resource assignment of the subcarrier RU of a specified PRB in the narrow band. Supposing that the type that can support the PRB level (some PRB or PRB #0, #1 or PRB #2, #3) resource assignment is A (A has a maximum value of 8), the number of PRBs that can support the Sub-PRB level resource assignment is B (B has a maximum value of 6), the type of the subcarrier RU is C (C is greater than or equal to 2 and C is smaller than or equal to 16), and the number of types of subcarrier RUs is D (D is 1 or 2), then $A+B*C*D \leq 2^Y$.

The PRB level resource assignment or the Sub-PRB level resource assignment is defined in a part of PRBs via the pre-defined configuration or RRC signaling (the system message or the user-specific RRC signaling) configuration.

(3) A method for implementing resource assignment on an MTC terminal Msg3 specifically includes one of the following features.

For a random access response (RAR) scheduling Msg3 message, a PRB level resource assignment solution is used.

For retransmission of the Msg3 message, the resource assignment solution is determined according to types of different random access processes.

In case of a competitive random access process, for the retransmission of the uplink (UL) grant scheduling Msg3, a PRB level resource assignment solution is used in Downlink Control Information (DCI).

In case of a non-competitive random access process, for the retransmission of the UL grant scheduling Msg3, if the Sub-PRB assignment is enabled, a resource assignment domain for the Sub-PRB assignment is used in the DCI to indicate whether the resource assignment is at the PRB level or at the Sub-PRB level.

Through the method proposed by the exemplary embodiments of the present disclosure, joint resource assignment at a PRB level resource assignment granularity and a Sub-PRB level resource assignment granularity may be implemented flexibly, and the spectral efficiency for sending uplink data is improved.

Specifically, the PRB level resource assignment granularity and the Sub-PRB level (subcarrier level) resource assignment granularity in the narrow band in the CE modes A and B are indicated via X bits, so as to support resource assignment for all PRBs or a part of PRBs in the narrow band as well as resource assignment of the subcarrier RU in any PRB or a part of PRBs or a specified PRB in the narrow band. X=5 or 6 or 7 or 8 in the CE mode A, and X=3 or 4 or 5 or 6 in the CE mode B.

For the PRB level resource assignment, M types of resource assignment at the PRB level resource assignment granularity can be indicated. M has the maximum value of 21 in the CE mode A; and M has the maximum value of equal to 8 in the CE mode B.

For the Sub-PRB level resource assignment, the Sub-PRB level (subcarrier level) resource assignment of any one PRB in 6 PRBs or a part of PRBs in the 6 PRBs or a specified PRB in the narrow band may be indicated. The number of PRBs that can be subjected to the Sub-PRB level resource assignment in the narrow band is P, and P is 1 or 2 or 3 or 4 or 5 or 6. Further, the PRB level resource assignment or the Sub-PRB level resource assignment is defined in all PRBs or a part of PRBs or a specified PRB via the pre-defined configuration or RRC signaling (the system message or the user-specific RRC signaling) configuration.

For the Sub-PRB level resource assignment, the number Q of subcarrier RUs may be Q={1, 2, 3, 4, 5, 6} or Q={1, 2, 3, 4} or Q={1, 2, 4} or Q={1, 2} in the CE mode A, and the number of subcarrier RUs may be Q=1 or Q=1, 2 in the CE mode B. The value of Q set is in one-to-one correspondence with the index value for the number of subcarrier RUs, for example, Q={1, 2, 4} is respectively corresponding to the index value 0, 1 and 2 for the number of subcarrier RUs.

At least one of subcarrier RU type tables shown in Table 1, Table 2, Table 3, Table 4, Table 5, Table 6, Table 7 and Table 8 can be supported for the Sub-PRB level resource assignment, and the number of types of subcarrier RUs that can be supported is R (R is greater than or equal to 2 and smaller than or equal to 16).

In the embodiments, $M+P \times Q \times R \leq 2^X$.

An RIV of X bits indicates the resource assignment at the PRB granularity and the subcarrier granularity. When the RIV of X bits is used to indicate the resource assignment at the subcarrier granularity, the RIV of the X bits is as follows:

RIV=index value for a type of the subcarrier RU+index value of the PRB*total number of states for the type of the subcarrier RU+index value for the number of subcarrier RUs*total number of states for the index value of the PRB*total number of states for the type of the subcarrier RU.

RIV=index value for a type of the subcarrier RU+index value for the number of subcarrier RUs*total number of states for the type of the subcarrier RU+index value of the PRB*total number of states for a number index of the subcarrier RU*total number of states for the type of the subcarrier RU.

RIV=index value of the PRB+index value for the type of the subcarrier RU*total number of states for the index value of the PRB+index value for the number of subcarrier RUs*total number of states for the index value of the PRB*total number of states of the index value for the type of the subcarrier RU.

RIV=index value of the PRB+index value for the number of subcarrier RUs*total number of states for the index value of the PRB+index value for a type of the subcarrier RU*total number of states for the index value of the PRB*total number of states of the index value for the number of subcarrier RUs.

RIV=index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU.

RIV=index value for the number of subcarrier RUs+index value of the PRB*total number of states for the number of subcarrier RUs+index value for a type of the subcarrier RU*total number of states for the number of subcarrier RUs*total number of states for the index value of the PRB.

RIV=Q+index value for a type of the subcarrier RU+index value of the PRB*total number of states for the type of the subcarrier RU+index value for the number of subcarrier RUs*total number of states for the index value of the PRB*total number of states for the type of the subcarrier RU.

RIV=Q+index value of the PRB*index value for the type of the subcarrier RU*total number of states for the index value of the subcarrier RU+index value for the number of subcarrier RUs*total number of states for the index value of the PRB*total number of states of the index value for the type of the subcarrier RU.

RIV=Q+index value for the number of subcarrier RUs+index value for a type of the subcarrier RU*total number of states for the number of subcarrier RUs+index value of the PRB*total number of states for the number of subcarrier RUs*total number of states of the index value for the type of the subcarrier RU.

RIV=Q+index value for a type of the subcarrier RU+index value for the number of subcarrier RUs*total number of states for the type of the subcarrier RU+index value of the PRB*total number of states of the index value for the number of subcarrier RUs*total number of states for the type of the subcarrier RU.

RIV=Q+index value of the PRB+index value for the number of subcarrier RUs*total number of states for the index value of the PRB+index value for a type of the subcarrier RU*total number of states for the index value of the PRB*total number of states of the index value for the number of subcarrier RUs.

RIV=Q+index value for the number of subcarrier RUs+index value of the PRB*total number of states for the number of subcarrier RUs+index value for a type of the subcarrier RU*total number of states for the number of subcarrier RUs*total number of states for the index value of the PRB.

The Q is a positive integer.

TABLE 1

| Type of subcarrier RU | Serial No. of frequency domain subcarrier included in the subcarrier RU (serial No. in the PRB) | |
|---|---|---|
| 0 | 3-subcarrier RU | Subcarrier #0, #1, #2 |
| 1 | | Subcarrier #3, #4, #5 |
| 2 | | Subcarrier #6, #7, #8 |
| 3 | | Subcarrier #9, #10, #11 |
| 4 | 6-subcarrier RU | Subcarrier #0, #1, #2, #3, #4, #5 |
| 5 | | Subcarrier #6, #7, #8, #9, #10, #11 |

TABLE 2

| Type of subcarrier RU | Serial No. of frequency domain subcarrier included in the subcarrier RU (serial No. in the PRB) | |
|---|---|---|
| 0 | 4-subcarrier RU | Subcarrier #0, #1, #2, #3 |
| 1 | | Subcarrier #, #4, #5, #6, #7 |
| 2 | | Subcarrier #8, #9, #10, #11 |
| 3 | 6-subcarrier RU | Subcarrier #0, #1, #2, #3, #4, #5 |
| 4 | | Subcarrier #6, #7, #8, #9, #10, #11 |
| 5 | | Subcarrier #3, #4, #5, #6, #7, #8 |

TABLE 3

| Type of subcarrier RU | Serial No. of frequency domain subcarrier included in the subcarrier RU (serial No. in the PRB) | |
|---|---|---|
| 0 | 4-subcarrier RU | Subcarrier #0, #1, #2, #3 |
| 1 | | Subcarrier #, #4, #5, #6, #7 |
| 2 | | Subcarrier #8, #9, #10, #11 |
| 3 | 6-subcarrier RU | Subcarrier #0, #1, #2, #3, #4, #5 |
| 4 | | Subcarrier #6, #7, #8, #9, #10, #11 |

TABLE 4

| Type of subcarrier RU | Serial No. of frequency domain subcarrier included in the subcarrier RU (serial No. in the PRB) | |
|---|---|---|
| 0 | 3-subcarrier RU | Subcarrier #0, #1, #2 |
| 1 | | Subcarrier #3, #4, #5 |
| 2 | | Subcarrier #6, #7, #8 |
| 3 | | Subcarrier #9, #10, #11 |
| 4 | 6-subcarrier RU | Subcarrier #0, #1, #2, #3, #4, #5 |
| 5 | | Subcarrier #6, #7, #8, #9, #10, #11 |
| 6 | | Subcarrier #3, #4, #5, #6, #7, #8 |

TABLE 5

| Type of subcarrier RU | Serial No. of frequency domain subcarrier included in the subcarrier RU (serial No. in the PRB) | |
|---|---|---|
| 0 | 3-subcarrier RU | Subcarrier #0, #1, #2 |
| 1 | | Subcarrier #3, #4, #5 |
| 2 | | Subcarrier #6, #7, #8 |
| 3 | | Subcarrier #9, #10, #11 |
| 4 | 4-subcarrier RU | Subcarrier #0, #1, #2, #3 |
| 5 | | Subcarrier #4, #5, #6, #7 |
| 6 | | Subcarrier #8, #9, #10, #11 |

TABLE 6

| Type of subcarrier RU | Serial No. of frequency domain subcarrier included in the subcarrier RU (serial No. in the PRB) | |
|---|---|---|
| 0 | 6-subcarrier RU | Subcarrier #0, #1, #2, #3, #4, #5 |
| 1 | | Subcarrier #6, #7, #8, #9, #10, #11 |

TABLE 7

| Type of subcarrier RU | Serial No. of frequency domain subcarrier included in the subcarrier RU (serial No. in the PRB) | |
|---|---|---|
| 0 | 4-subcarrier RU | Subcarrier #0, #1, #2, #3 |
| 1 | | Subcarrier #4, #5, #6, #7 |
| 2 | | Subcarrier #8, #9, #10, #11 |

TABLE 8

| Type of subcarrier RU | Serial No. of frequency domain subcarrier included in the subcarrier RU (serial No. in the PRB) | |
|---|---|---|
| 0 | 3-subcarrier RU | Subcarrier #0, #1, #2 |
| 1 | | Subcarrier #3, #4, #5 |
| 2 | | Subcarrier #6, #7, #8 |
| 3 | | Subcarrier #9, #10, #11 |

Figure 4A:
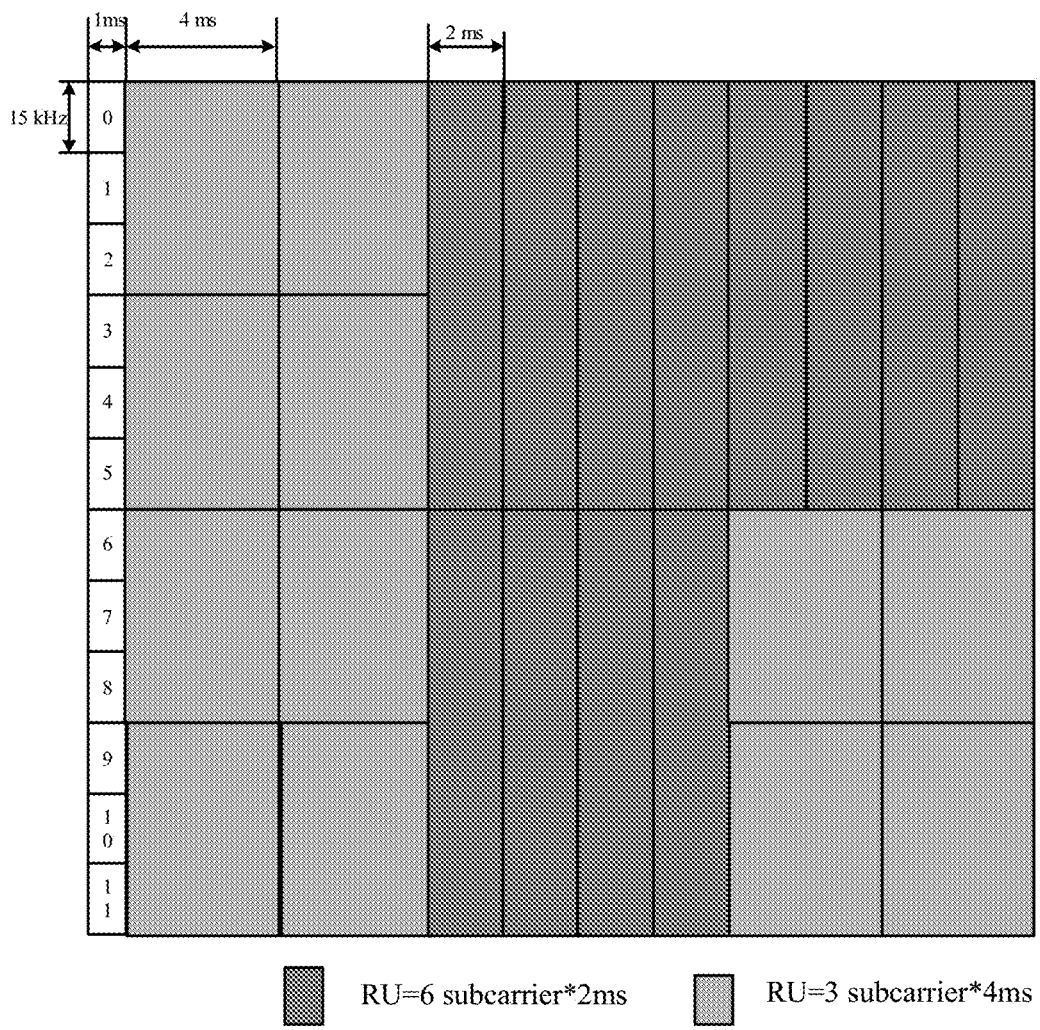
FIG. 4(a) illustrates a first schematic diagram of a type of a subcarrier RU provided by an embodiment of the present disclosure.
Figure 4B:
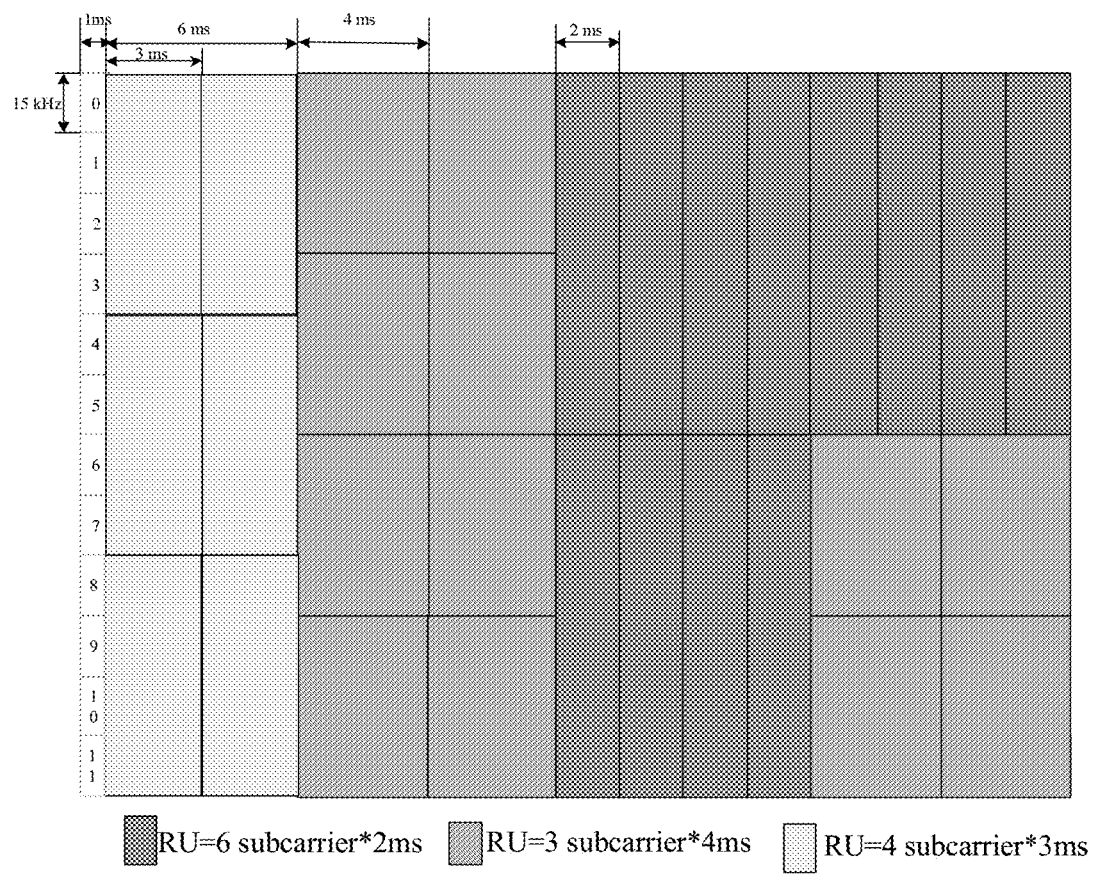
FIG. 4(b) illustrates a second schematic diagram of a type of a subcarrier RU provided by an embodiment of the present disclosure.
Figure 5:
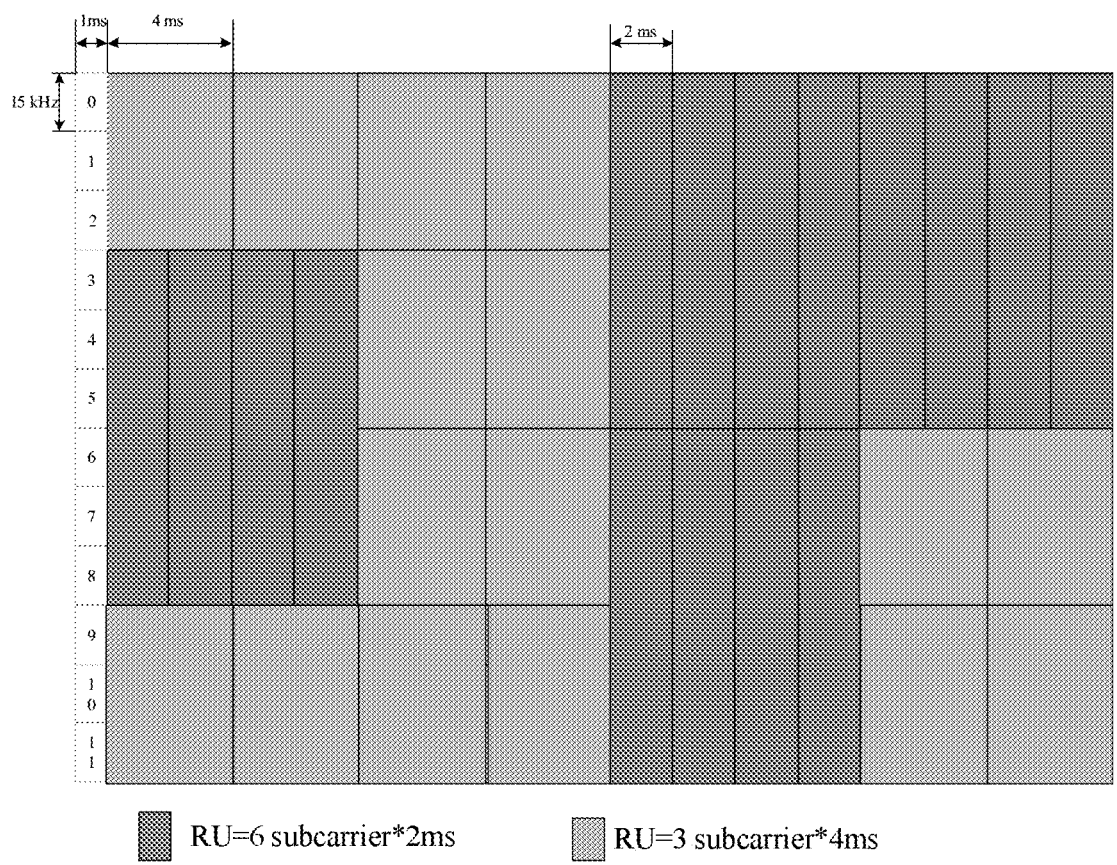
FIG. 5 illustrates a third schematic diagram of a type of a subcarrier RU provided by an embodiment of the present disclosure.

The 3-subcarrier RU, the 4-subcarrier RU and the 6-subcarrier RU are as shown in FIG. 4(a), FIG. 4(b) and FIG. 5.

Exemplary Embodiment 1

This exemplary embodiment describes solving a problem of flexible resource assignment at a PRB resource assignment granularity and a Sub-PRB resource assignment granularity in a CE mode A.

A resource assignment field having a length of 8 bits in a narrow band is used to indicate the resource assignment at the PRB level resource assignment granularity and the Sub-PRB level (that is, subcarrier level) resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 1 and FIG. 4(a) (or Table 2 or FIG. 4(b)), there are 3-subcarrier RU (or 4-subcarrier RU) and 6-subcarrier RU, and 6 types of subcarrier RUs are supported in total. The number of RUs for the 3-subcarrier RU (or 4-subcarrier RU) and 6-subcarrier RU is 1 or 2 or 3 or 4 or 5 or 6. The 8 bits indicate 256 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 8 bits indicate the resource assignment of the subcarrier RU, 216 (6*6*6)

states are required to indicate resource information of different subcarrier RUs (the resource information refers to the PRB where the subcarrier RU is located, the type of the subcarrier RU and the number of subcarrier RUs), as shown in Table 9.

TABLE 9

| 8-bit resource assignment domain in the narrow band | Assigned PRB resource or subcarrier RU |
|---|---|
| 00000000-00010100 (21 states in total) | Indicate 21 resources assigned according to the uplink grant type 0 in the narrow band |
| 00010101-11101100 (216 states in total) | Indicate the type of some uplink subcarrier RU in the narrow band, the PRB where the RU is located and the number of uplink subcarrier RUs |
| 11101101-11111111 | Reserved |

By means of an 8-bit resource assignment domain in the narrow band, this embodiment may flexibly indicate the resource assignment at the PRB level (the UL grant type 0) in all narrow bands as well as the resource assignment of the 6 types of subcarrier RUs that have the maximum number of RUs of 6 and are shown in Table 1/Table 2.

Exemplary Embodiment 2

This embodiment describes solving a problem of flexible resource assignment at a PRB resource assignment granularity and a Sub-PRB resource assignment granularity in a CE mode A.

A resource assignment field having a length of 8 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 4 and FIG. 5 (or Table 5 or FIG. 4(b)), there are 3-subcarrier RU and 6-subcarrier RU (or 4-carrier RU), and 7 types of subcarrier RUs are supported in total. The number of RUs for the 3-subcarrier RU or 6-subcarrier RU (or 4-subcarrier RU) is 1 or 2 or 3 or 4. The 8 bits indicate 256 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 8 bits indicate the resource assignment of the subcarrier RU, 168 (6*7*4) states are required to indicate resource information of different subcarrier RUs (the resource information refers to the PRB where the subcarrier RU is located, the type of the subcarrier RU and the number of subcarrier RUs), as shown in Table 10.

TABLE 10

| 8-bit resource assignment domain in the narrow band | Assigned PRB resource or subcarrier RU |
|---|---|
| 00000000-00010100 (21 states in total) | Indicate 21 resources assigned according to the uplink grant type 0 in the narrow band |
| 00010101-10111100 (168 states in total) | Indicate the type of some uplink subcarrier RU in the narrow band, the PRB where the RU is located and the number of uplink subcarrier RUs |
| 10111101-11111111 | Reserved |

By using an 8-bit resource assignment domain in the narrow band, this embodiment may flexibly indicate the resource assignment at the PRB level (the UL grant type 0) in all narrow bands as well as the resource assignment of the 7 types of subcarrier RUs which have the maximum number of RUs of 4 and are shown in Table 4/Table 5.

Exemplary Embodiment 3

This embodiment mainly solves a problem of flexible resource assignment at a PRB resource assignment granularity and a Sub-PRB resource assignment granularity in a CE mode A.

A resource assignment field having a length of 7 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 1 and Table 2, there are 3-subcarrier RU (or 4-subcarrier RU) and 6-subcarrier RU, and 6 types of subcarrier RUs are supported in total. The number of RUs for the 3-subcarrier RU (or 4-subcarrier RU) or 6-subcarrier RU is 1 or 2 or 4. The 7 bits indicate 128 states in total, 20 states of which are used for indicating the PRB RU assigned according to the UL grant type 0 in the narrow band (type of assignment is limited for continuous PRBs, for example, only continuous PRBs (e.g., 5 continuous PRBs) with PRB index #0 can be assigned). When the 7 bits indicate the resource assignment of the subcarrier RU, 108 (6*6*3) states are required to indicate resource information of different subcarrier RUs (the resource information refers to the PRB where the subcarrier RU is located, the type of the subcarrier RU and the number of subcarrier RUs), as shown in Table 11.

TABLE 11

| 7-bit resource assignment domain in the narrow band | Assigned PRB resource or subcarrier RU |
|---|---|
| 0000000-0010011 (20 states in total) | Indicate 20 types among 21 types of resources assigned according to the uplink grant type 0 in the narrow band |
| 0010100-1111111 (108 states in total) | Indicate the type of some uplink subcarrier RU in the narrow band, the PRB where the RU is located and the number of uplink subcarrier RUs |

By means of a 7-bit resource assignment domain in the narrow band, this embodiment may flexibly indicate the resource assignment at the PRB level (the UL grant type 0) in all narrow bands as well as the resource assignment of the 6 types of subcarrier RUs which have the maximum number of RUs of 1 or 2 or 4 and are shown in Table 1/Table 2.

Exemplary Embodiment 4

This embodiment describes solving a problem of flexible resource assignment at a PRB resource assignment granularity and a Sub-PRB resource assignment granularity in a CE mode A.

A resource assignment field having a length of 7 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB or a part of defined PRBs in the narrow band. As shown in Table 1, there are 3-subcarrier RU and 6-subcarrier RU, and 6 types of subcarrier RUs are supported in total; or as shown in Table 3, there are 4-subcarrier RU and 6-subcarrier RU, and 5 types of subcarrier RUs are supported in total. The number of RUs for the 4-subcarrier RU or 6-subcarrier RU is 1 or 2 or 4. The 7 bits indicate 128 states in total, 21 states of which are used for indicating the PRB RU assigned according to the UL grant type 0 in the narrow band. When the 7 bits indicate the resource assignment of the subcarrier RU, 90 (6*5*3 or 5*6*3) states are required to indicate resource information of different subcarrier RUs (the resource information refers to the PRB where the subcarrier RU is located, the type of the subcarrier RU and the number of subcarrier RUs), as shown in Table 12.

TABLE 12

| 7-bit resource assignment domain in the narrow band | Assigned PRB resource or subcarrier RU |
| --- | --- |
| 0000000-0010100 (21 states in total) | Indicate 21 resources assigned according to the uplink grant type 0 in the narrow band |
| 0010101-1101110 (90 states in total) | Indicate the type of some uplink subcarrier RU in the narrow band, the PRB where the RU is located and the number of uplink subcarrier RUs (if the assignment of the uplink subcarrier RU is performed in a part of PRBs, pre-define or configure) |
| 1101111-1111111 | Reserved |

By using a 7-bit resource assignment domain in the narrow band, this embodiment may flexibly indicate the resource assignment at the PRB level (the UL grant type 0) in all narrow bands as well as the resource assignment of the 5 types of subcarrier RUs which have the maximum number of RUs of 1 or 2 or 4 and are shown in Table 3.

Exemplary Embodiment 5

This embodiment describes solving a problem of flexible resource assignment at a PRB resource assignment granularity and a Sub-PRB resource assignment granularity in a CE mode A.

A resource assignment field having a length of 7 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 8, there are 3-subcarrier RU, and 4 types of subcarrier RUs are supported in total. The number of RUs for the 3-subcarrier RU is 1 or 2 or 3 or 4. The 7 bits indicate 128 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 7 bits indicate the resource assignment of the subcarrier RU, 96 (6*4*4) states are required to indicate resource information of different subcarrier RUs (the resource information refers to the PRB where the subcarrier RU is located, the type of the subcarrier RU and the number of subcarrier RUs), as shown in Table 13.

TABLE 13

| 7-bit resource assignment domain in the narrow band | Assigned PRB resource or subcarrier RU |
| --- | --- |
| 0000000-0010100 (21 states in total) | Indicate 21 resources assigned according to the uplink grant type 0 in the narrow band |
| 0010101-1110110 (96 states in total) | Indicate the type of some uplink subcarrier RU in the narrow band, the PRB where the RU is located and the number of uplink subcarrier RUs |
| 1110101-1111111 | Reserved |

By using a 7-bit resource assignment domain in the narrow band, this embodiment may flexibly indicate the resource assignment at the PRB level (the UL grant type 0) in all narrow bands and flexibly indicate 4 types of subcarrier RUs that have the maximum number of RUs of 4 and are shown in Table 8.

Exemplary Embodiment 6

This embodiment describes solving a problem of flexible resource assignment at a PRB resource assignment granularity and a Sub-PRB resource assignment granularity in a CE mode A.

A resource assignment field having a length of 7 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 1 or Table 2, there are 3-subcarrier RU (or 4-subcarrier RU) and 6-subcarrier RU, and 6 types of subcarrier RUs are supported in total. The number of RUs for the 3-subcarrier RU (or 4-subcarrier RU) or 6-subcarrier RU is 1 or 2 or 3 or 4. The 7 bits indicate 128 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 7 bits indicate the resource assignment of the subcarrier RU, 96 (4*6*4) states are required to indicate resource information of different subcarrier RUs (the resource information refers to the PRB where the subcarrier RU is located, the type of the subcarrier RU and the number of subcarrier RUs), as shown in Table 14.

TABLE 14

| 7-bit resource assignment domain in the narrow band | Assigned PRB resource or subcarrier RU |
| --- | --- |
| 0000000-0010100 (21 states in total) | Indicate 21 resources assigned according to the uplink grant type 0 in the narrow band |
| 0010101-1110100 (96 states in total) | Indicate the type of some uplink subcarrier RU in the narrow band, the PRB where the RU is located and the number of uplink subcarrier RUs (the PRB is a part of PRBs that are pre-defined or configured via RRC signaling) |
| 1110101-1111111 | Reserved |

By using a 7-bit resource assignment domain in the narrow band, this embodiment may flexibly indicate the resource assignment of the PRB level (the UL grant type 0) in all narrow bands and flexibly indicate 6 types of subcarrier RUs that have the maximum number of RUs of 4.

In addition, for the 7-bit resource assignment domain in the narrow band, when the 7 bits indicate the resource assignment of the subcarrier RU, the resource assignment of 7 types of subcarrier units shown in Table 7 in the 5 PRBs may be indicated via 105 states (5*7*3). The specific embodiment will no longer be elaborated.

Exemplary Embodiment 7

This embodiment describes solving a problem of flexible resource assignment at a PRB resource assignment granularity and a Sub-PRB resource assignment granularity in a CE mode A.

A resource assignment field having a length of 6 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in a part of PRBs in the narrow band. As shown in Table 1 or Table 2, there are 3-subcarrier RU and 6-subcarrier RU (or 4-subcarrier RU), and 6 types of subcarrier RUs are supported in total. The number of RUs for the 3-subcarrier RU or 6-subcarrier RU (or 4-subcarrier RU) is 2 (the number of supported subcarrier RUs is 1 or 2) or the number of 3 supported subcarrier RUs is 1 or 2 or 4). The 6 bits indicate 64 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 6 bits indicate the resource assignment of the subcarrier RU, 3 PRBs are defined to perform the resource assignment of the subcarrier RU, and 36 (3*6*2 or 2*6*3) states are required to indicate resource information of different subcarrier RUs (the resource information refers to the PRB where the subcarrier RU is located, the type of the subcarrier RU and the number of subcarrier RUs), as shown in Table 15. A serial number of a PRB supporting the resource assignment of the subcarrier RU is directly or indirectly indicated via RRC signaling (a system message or user-specific RRC signaling). For example, 3 specific PRBs are indicated directly or first 3 or last 3 PRBs in the narrow band are indicated via 1 bit.

TABLE 15

| 6-bit resource assignment domain in the narrow band | Assigned PRB resource or subcarrier RU |
| --- | --- |
| 000000-010100 (21 states in total) | Indicate 21 resources assigned according to the uplink grant type 0 in the narrow band |
| 010101-111000 (36 states in total) | Indicate the type of some uplink subcarrier RU in the narrow band, the PRB where the RU is located and the number of uplink subcarrier RUs (the PRB is a part of PRBs that are pre-defined or configured via RRC signaling) |
| 111001-111111 | Reserved |

By using a 6-bit resource assignment domain in the narrow band this embodiment may flexibly indicate the resource assignment at the PRB level (the UL grant type 0) in all narrow bands and flexibly indicate the resource assignment of 6 types of subcarrier RUs that are configured via the RRC signaling, have the maximum number of RUs of 2 and are shown in Table 1/Table 2.

Exemplary Embodiment 8

This embodiment describes solving a problem of flexible resource assignment at a PRB resource assignment granularity and a Sub-PRB resource assignment granularity in a CE mode A.

A resource assignment field having a length of 6 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 8, there are 3-subcarrier RU, and 4 types of subcarrier RUs are supported in total. The type for the number of subcarrier RUs in the 3-subcarrier RU is 2 (the number of subcarrier RUs is 1 or 2) or 3 (the number of subcarrier RUs is 1 or 2 or 4) or 4 (the number of subcarrier RUs is 1 or 2 or 3 or 4). The 6 bits indicate 64 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 6 bits indicate the resource assignment of the subcarrier RU, 5 or 4 or 3 or 2 PRBs are defined to perform the resource assignment of the subcarrier RU, and 40 (5*4*2) states or 32 (2*4*4) states or 36 (3*4*3) are required to indicate resource information of different subcarrier RUs (the resource information refers to the PRB where the subcarrier RU is located, the type of the subcarrier RU and the number of subcarrier RUs). The 40 states are distributed as shown in Table 16 (the 32 or 36 states are omitted). A PRB serial number incapable of performing the resource assignment of the subcarrier RU is indicated via RRC signaling (a system message or user-specific RRC signaling).

TABLE 16

| 6-bit resource assignment domain in the narrow band | Assigned PRB resource or subcarrier RU |
| --- | --- |
| 000000-010100 (21 states in total) | Indicate 21 resources assigned according to the uplink grant type 0 in the narrow band |
| 010101-111100 (40 states in total) | Indicate the type of some uplink subcarrier RU in the narrow band, the PRB where the RU is located and the number of uplink subcarrier RUs (the PRB is pre-defined or configured and determined via RRC signaling) |
| 111101-111111 | Reserved |

By using a 6-bit resource assignment domain in the narrow band, this embodiment may flexibly indicate the resource assignment at the PRB level (the UL grant type 0) in all narrow bands and flexibly indicate the resource assignment of 4 types of subcarrier RUs that are configured via the RRC signaling, have the maximum number of RUs of 2 (or 3 or 4) and are shown in Table 8.

Exemplary Embodiment 9

This embodiment describes solving a problem of flexible resource assignment at a PRB resource assignment granularity and a Sub-PRB resource assignment granularity in a CE mode A.

A resource assignment field having a length of 5 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 8, there are 3-subcarrier RU, and 4 types of subcarrier RUs are supported in total. The number of subcarrier RUs for the 3-subcarrier RU is 1 or 2. The 5 bits indicate 32 states in total, 21 states of which are used for indicating the PRB RU assigned according to the UL grant type 0 in the narrow band (that is, any 1 PRB, or any 2 or 3 or 4 or 5 or 6 continuous PRBs are assigned). When the 5 bits indicate the resource assignment of the subcarrier RU, some PRB is defined to perform the resource assignment of the subcarrier RU, and 8 (1*4*2) states are required to indicate resource information of different subcarrier RUs (the resource information refers to the PRB where the subcarrier RU is located, the type of the subcarrier RU and the number of subcarrier RUs), as shown in Table 17. A serial number of a PRB supporting the resource assignment of the subcarrier RU is indicated via RRC signaling (a system message or user-specific RRC signaling).

TABLE 17

| 5-bit resource assignment domain in the narrow band | Assigned PRB resource or subcarrier RU |
| --- | --- |
| 00000-10100 (21 states in total) | Indicate 21 resources assigned according to the uplink grant type 0 in the narrow band |
| 10101-11100 (8 states in total) | Indicate the type of some uplink subcarrier RU in the narrow band, the PRB where the RU is located and the number of uplink subcarrier RUs (the PRB is pre-defined or configured via RRC signaling) |
| 11101-11111 | Reserved |

By using a 5-bit resource assignment domain in the narrow band, this embodiment may flexibly indicate the resource assignment at the PRB level (the UL grant type 0) in all narrow bands and flexibly indicate the resource assignment of 4 types of subcarrier RUs that are configured via the RRC signaling, have the maximum number of RUs of 2 and are shown in Table 8.

Exemplary Embodiment 10

This embodiment describes solving a problem of flexible resource assignment at a PRB resource assignment granularity and a Sub-PRB resource assignment granularity in a CE mode A.

A resource assignment field having a length of 5 bits in a narrow band is used to indicate the resource assignment at the PRB level resource assignment granularity and the Sub-PRB level resource assignment granularity in the narrow band, so as to support the resource assignment of 1 PRB or 2 or 3 or 4 or 5 or 6 continuous PRBs (UL grant type 0) in the narrow band as well as the resource assignment of a subcarrier RU in any PRB in the narrow band. As shown in Table 1 or Table 2, there are 3-subcarrier RU (or 4-subcarrier RU) and 6-subcarrier RU, and 6 types of subcarrier RUs are supported in total. The number of subcarrier RUs for the 3-subcarrier RU or 6-subcarrier RU is 1 or 2. The 5 bits indicate 32 states in total, 20 states of which are used for indicating the PRB RU assigned according to the UL grant type 0 in the narrow band (type of assignment is limited for continuous PRBs, for example, only continuous PRBs (e.g., 5 continuous PRBs) with PRB index #0 can be assigned). When the 5 bits indicate the resource assignment of the subcarrier RU, the PRBs capable of performing the resource assignment of the subcarrier RU are defined in some PRB, and 12 (1*6*2) states are required to indicate resource information of different subcarrier RUs (the resource information refers to the PRB where the subcarrier RU is located, the type of the subcarrier RU and the number of subcarrier RUs), as shown in Table 18. A serial number of a PRB supporting the resource assignment of the subcarrier RU is indicated via RRC signaling (a system message or user-specific RRC signaling).

TABLE 18

| 5-bit resource assignment domain in the narrow band | Assigned PRB resource or subcarrier RU |
| --- | --- |
| 00000-10011 (20 states in total) | Indicate 20 types among 21 types of resources assigned according to the uplink grant type 0 in the narrow band |
| 10100-11100 (12 states in total) | Indicate the type of some uplink subcarrier RU in the narrow band, the PRB where the RU is located and the number of uplink subcarrier RUs (the PRB is pre-defined or configured via RRC signaling) |
| 11101-11111 | Reserved |

By using a 5-bit resource assignment domain in the narrow band, this embodiment may flexibly indicate the resource assignment at the PRB level (the UL grant type 0) in all narrow bands and may indicate the resource assignment of 6 types of subcarrier RUs that are configured via the RRC signaling, have the maximum number of RUs of 2 in the PRB and are shown in Table 1/Table 2.

Exemplary Embodiment 11

This embodiment describes solving a problem of joint resource assignment at a PRB resource assignment granularity and a Sub-PRB resource assignment granularity in a CE mode B.

A resource assignment field having a length of 6 bits in a narrow band is used to indicate the resource assignment at the PRB level resource assignment granularity and the Sub-PRB level resource assignment granularity in the narrow band, so as to support the resource assignment of 1 PRB or 2 continuous PRBs (PRB #0, #1 or PRB #2, #3) in the narrow band as well as the resource assignment of a subcarrier RU in any PRB in the narrow band. As shown in Table 8, there are 3-subcarrier RU, and 4 types of subcarrier RUs are supported in total. The number of subcarrier RUs for the 3-subcarrier RU is 1 or 2. The 6 bits indicate 64 states in total, 8 states of which are used for indicating the PRB RU assigned according to the PRB level resource assignment granularity in the narrow band (any one PRB or PRB #0, #1 or PRB #2, #3). When the 6 bits indicate the resource assignment of the subcarrier RU, 48 (6*4*2) states are required to indicate resource information of different subcarrier RUs (the resource information refers to the PRB where the subcarrier RU is located, the type of the subcarrier RU and the number of subcarrier RUs), as shown in Table 19.

TABLE 19

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 001000-110111 (48 states in total) | Indicate the type of some uplink subcarrier RU in the narrow band, the PRB where the RU is located and the number of uplink subcarrier RUs |
| 111000-111111 | Reserved |

By using a 6-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 4 types of subcarrier RUs that have the maximum number of RUs of 2 in the PRB and are shown in Table 8.

Exemplary Embodiment 12

This embodiment describes solving a problem of joint resource assignment at a PRB resource assignment granularity and a Sub-PRB resource assignment granularity in a CE mode B.

A resource assignment field having a length of 6 bits in a narrow band is used to indicate the resource assignment at the PRB level resource assignment granularity and the Sub-PRB level resource assignment granularity in the narrow band, so as to support the resource assignment of 1 PRB or 2 continuous PRBs in the narrow band (PRB #0, #1 or PRB #2, #3) as well as the resource assignment of a subcarrier RU in any PRB in the narrow band. As shown in Table 1/Table 2/Table 3 or Table 4/5, there are 3-subcarrier RU and/or 4-subcarrier RU and/or 6-subcarrier RU, and 5 or 6 or 7 types of subcarrier RUs are supported in total. The number of subcarrier RUs for the 3-subcarrier RU or 6-subcarrier RU is 1. The 6 bits indicate 64 states in total, 8 states of which are used for indicating the PRB RU (any one PRB or PRB #0, #1 or PRB #2, #3) assigned according to the PRB level resource assignment granularity in the narrow band. When the 6 bits indicate the resource assignment of the subcarrier RU, in any PRB, 30 (6*5*1) or 36 (6*6*1) or 42 (6*7*1) states are required to indicate resource information of different subcarrier RUs (the resource information refers to the PRB where the subcarrier RU is located, the type of the subcarrier RU and the number of subcarrier RUs), as shown in Table 20 or Table 21 or Table 22.

TABLE 20

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 000100-101011 (36 states in total) | Indicate the type of some uplink subcarrier RU in the narrow band, the PRB where the RU is located and the number of uplink subcarrier RUs |
| 101100-111111 | Reserved |

TABLE 21

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 001000-110001 (42 states in total) | Indicate the type of some uplink subcarrier RU in the narrow band, the PRB where the RU is located and the number of uplink subcarrier RUs |
| 110010-111111 | Reserved |

TABLE 22

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 001000-010101 (30 states in total) | Indicate the type of some uplink subcarrier RU in the narrow band, the PRB where the RU is located and the number of uplink subcarrier RUs |
| 010110-111111 | Reserved |

By using a 6-bit resource assignment domain in the narrow band, this embodiment may indicate the resource assignment at the PRB level in the narrow band (any, one PRB or PRB #0, #1 or PRB #2, #3 is assigned in the narrow band) and the resource assignment of 5 or 6 or 7 types of subcarrier RUs that have the maximum number of RUs of 1 in the PRB and are shown in Table 1/Table 2/Table 3 or Table 4/Table 5.

Exemplary Embodiment 13

This embodiment describes solving a problem of joint resource assignment at a PRB resource assignment granularity and a Sub-PRB resource assignment granularity in a CE mode B.

A resource assignment field having a length of 6 bits in a narrow band is used to indicate the resource assignment at the PRB level resource assignment granularity and the Sub-PRB level resource assignment granularity in the narrow band, so as to support the resource assignment of 1 PRB or 2 continuous PRBs in the narrow band (PRB #0, #1 or PRB #2, #3) as well as the resource assignment of a subcarrier RU in any PRB in the narrow band. As shown in Table 1-A/Table 1-B/Table 1-C or Table 1-D/1-E, there are 3-subcarrier RU and/or 4-subcarrier RU and/or 6-subcarrier RU, and 5 or 6 or 7 types of subcarrier RUs are supported in total. The number of subcarrier RUs for the 3-subcarrier RU or 6-subcarrier RU is 1 or 2. The 6 bits indicate 64 states in total, 8 states of which are used for indicating the PRB RU (any one PRB or PRB #0, #1 or PRB #2, #3) assigned according to the PRB level resource assignment granularity in the narrow band. When the 6 bits indicate the resource assignment of the subcarrier RU, in any PRB, 40/50 (4/5*5*2) or 36/48 (3/4*6*2) states or 42/56 (3/4*7*2) are required to indicate resource information of different subcarrier RUs (the resource information refers to the PRB where the subcarrier RU is located, the type of the subcarrier RU and the number of subcarrier RUs), as shown in Table 23 or Table 24 or Table 25.

TABLE 23

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 000100-101011 (36 states in total) | Indicate the type of some uplink subcarrier RU in the narrow band, the PRB where the RU is located and the number of uplink subcarrier RUs (the PRB is a part of PRBs that are pre-defined or configured via RRC signaling) |
| 101100-111111 | Reserved |

TABLE 24

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 001000-110001 (42 states in total) | Indicate the type of some uplink subcarrier RU in the narrow band, the PRB where the RU is located and the number of uplink subcarrier RUs (the PRB is a part of PRBs that are pre-defined or configured via RRC signaling) |
| 110010-111111 | Reserved |

TABLE 25

| 6-bit resource assignment domain in the narrow band | Assigned PRB resource or subcarrier RU |
|---|---|
| 000000-000111 (8 states in total) | Indicate any one PRB or PRB#0, #1 or PRB#2, #3 assigned in the narrow band |
| 001000-010101 (30 states in total) | Indicate the type of some uplink subcarrier RU in the narrow band, the PRB where the RU is located and the number of uplink subcarrier RUs (the PRB is a part of PRBs that are pre-defined or configured via RRC signaling) |
| 010110-111111 | Reserved |

By using a 6-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 5 or 6 or 7 types of subcarrier RUs that have the maximum number of RUs of 2 in the PRB and are shown in Table 1/Table 2/Table 3 or Table 4/Table 5.

Exemplary Embodiment 14

This embodiment describes solving a problem of joint resource assignment at a PRB resource assignment granularity and a Sub-PRB resource assignment granularity in a CE mode B.

A resource assignment field having a length of 5 bits in a narrow band is used to indicate the resource assignment at the PRB level resource assignment granularity and the Sub-PRB level resource assignment granularity in the narrow band, so as to support the resource assignment of 1 PRB or 2 continuous PRBs (PRB #0, #1 or PRB #2, #3) in the narrow band as well as the resource assignment of a subcarrier RU in any PRB in the narrow band. As shown in Table 8, there are 3-subcarrier RU, and 4 types of subcarrier RUs are supported in total. The number of subcarrier RUs for the 3-subcarrier RU is 1. The 5 bits indicate 32 states in total, 8 states of which are used for indicating the PRB RU assigned according to the PRB level resource assignment granularity in the narrow band (any one PRB or PRB #0, #1 or PRB #2, #3). When the 6 bits indicate the resource assignment of the subcarrier RU, in any PRB, 24 (6*4*1) states are required to indicate resource information of different subcarrier RUs (the resource information refers to the PRB where the subcarrier RU is located, the type of the subcarrier RU and the number of subcarrier RUs), as shown in Table 26.

TABLE 26

| 5-bit resource assignment domain in the narrow band | Assigned PRB resource or subcarrier RU |
|---|---|
| 00000-00111 (8 states in total) | Indicate any one PRB or PRB#0, #1 or PRB#2, #3 assigned in the narrow band |
| 01000-11111 (24 states in total) | Indicate the type of some uplink subcarrier RU in the narrow band, the PRB where the RU is located and the number of uplink subcarrier RUs |

By using a 5-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 4 types of subcarrier RUs that have the maximum number of RUs of 1 in the PRB and are shown in Table 8.

Exemplary Embodiment 15

This embodiment describes solving a problem of joint resource assignment at a PRB resource assignment granularity and a Sub-PRB resource assignment granularity in a CE mode B.

A resource assignment field having a length of 5 bits in a narrow band is used to indicate the resource assignment at the PRB level resource assignment granularity and the Sub-PRB level resource assignment granularity in the narrow band, so as to support the resource assignment of 1 PRB or 2 continuous PRBs in the narrow band (PRB #0, #1 or PRB #2, #3) as well as the resource assignment of a subcarrier RU in a part of PRBs in the narrow band. As shown in Table 1/Table 2/Table 3, there are 3-subcarrier RU and/or 4-subcarrier RU and/or 6-subcarrier RU, and 6 or 5 types of subcarrier RUs are supported in total. The number of subcarrier RUs for the 3-subcarrier RU is 1 or 2. The 5 bits indicate 32 states in total, 8 states of which are used for indicating the PRB RU assigned according to the PRB level resource assignment granularity in the narrow band (any one PRB or PRB #0, #1 or PRB #2, #3). When the 5 bits indicate the resource assignment of the subcarrier RU, 24 (2*6*2) states or 20 (2*5*2) states are required to indicate resource information of different subcarrier RUs (the resource assignment of the subcarrier RU is defined in a part of PRBs, such as 2 PRBs, in the narrow band), as shown in Table 26 or Table 27. A serial number of a PRB supporting the resource assignment of the subcarrier RU is pre-defined or indicated via RRC signaling (a system message or user-specific RRC signaling).

TABLE 27

| 5-bit resource assignment domain in the narrow band | Assigned PRB resource or subcarrier RU |
| --- | --- |
| 00000-00111 (8 states in total) | Indicate any one PRB or PRB#0, #1 or PRB#2, #3 assigned in the narrow band |
| 01000-11011 (20 states in total) | Indicate the type of some uplink subcarrier RU in the narrow band, the PRB where the RU is located and the number of uplink subcarrier RUs |
| 11011-11111 | Reserved |

By using a 5-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 6 or 5 types of subcarrier RUs that have the maximum number of RUs of 2 in the special PRB and are shown in Table 1/2/3.

Exemplary Embodiment 16

This embodiment describes solving a problem of joint resource assignment at a PRB resource assignment granularity and a Sub-PRB resource assignment granularity in a CE mode B.

A resource assignment field having a length of 4 bits in a narrow band is used to indicate the resource assignment at the PRB level resource assignment granularity and the Sub-PRB level resource assignment granularity in the narrow band, so as to support the resource assignment of 1 PRB or 2 continuous PRBs (PRB #0, #1 or PRB #2, #3) in the narrow band as well as the resource assignment of a subcarrier RU in a part of PRBs in the narrow band. As shown in Table 1-H, there are 3-subcarrier RU, and 4 types of subcarrier RUs are supported in total. The number of subcarrier RUs for the 3-subcarrier RU is 1 or 2. The 4 bits indicate 16 states in total, 8 states of which are used for indicating the PRB RU (any one PRB or PRB #0, #1 or PRB #2, #3) assigned according to the PRB level resource assignment granularity in the narrow band. When the 4 bits indicate the resource assignment of the subcarrier RU, the resource assignment is limited in a part of PRBs. e.g., 2 PRBs, in the narrow band, and 8 (2*4*1) (in a case where the maximum number of subcarrier RUs that can be supported is 1) states are required to indicate resource information of different subcarrier RUs (the resource information refers to the type of the subcarrier RU and the number of subcarrier RUs), as shown in Table 17. Or, when the 4 bits indicate the resource assignment of the subcarrier RU, the resource assignment is limited in some PRB in the narrow band, and 8 (1*4*2) (in a case where the maximum number of subcarrier RUs that can be supported is 2) states are required to indicate resource information of different subcarrier RUs (the resource information refers to the type of the subcarrier RU and the number of subcarrier RUs), as shown in Table 28. A serial number of a PRB supporting the resource assignment of the subcarrier RU is pre-defined or indicated via RRC signaling (a system message or user-specific RRC signaling).

TABLE 28

| 4-bit resource assignment domain in the narrow band | Assigned PRB resource or subcarrier RU |
| --- | --- |
| 0000 | PRB #0 |
| 0001 | PRB #1 |

TABLE 28-continued

| 4-bit resource assignment domain in the narrow band | Assigned PRB resource or subcarrier RU |
| --- | --- |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | Subcarrier #0, #1, #2 in PRB #j |
| 1001 | Subcarrier #3, #4, #5 in PRB #j |
| 1010 | Subcarrier #6, #7, #8 in PRB #j |
| 1011 | Subcarrier #9, #10, #11 in PRB #j |
| 1100 | Subcarrier #0, #1, #2 in PRB #k |
| 1101 | Subcarrier #3, #4, #5 in PRB #k |
| 1110 | Subcarrier #6, #7, #8 in PRB #k |
| 1111 | Subcarrier #9, #10, #11 in PRB #k |

Note:
the j and/or the k is pre-defined or configured via RRC signaling: and the j and the k are selected from {0, 1, 2, 3, 4, 5} or a subset of {0, 1, 2, 3, 4, 5}.

By using a 4-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 4 types of subcarrier RUs that have the maximum number of RUs of 1 in the special PRB and are shown in Table 8.

Exemplary Embodiment 17

This embodiment describes solving a problem of joint resource assignment at a PRB resource assignment granularity and a Sub-PRB resource assignment granularity in a CE mode B.

A resource assignment field having a length of 4 bits in a narrow band is used to indicate the resource assignment at the PRB level resource assignment granularity and the Sub-PRB level resource assignment granularity in the narrow band, so as to support the resource assignment of 1 PRB or 2 continuous PRBs in the narrow band (PRB #0, #1 or PRB #2, #3) as well as the resource assignment of a subcarrier RU in a specified PRB in the narrow band. As shown in Table 1/Table 2/Table 3 or Table 4/Table 5, there are 3-subcarrier RU and/or 4-subcarrier RU and/or 6-subcarrier RU, and 5 or 6 or 7 types of subcarrier RUs are supported in total. The number of subcarrier RUs for the 3-subcarrier RU is 1. The 4 bits indicate 16 states in total, 8 states of which are used for indicating the PRB RU (any one PRB or PRB #0, #1 or PRB #2, #3) assigned according to the PRB level resource assignment granularity in the narrow band. When the 4 bits indicate the resource assignment of the subcarrier RU, the resource assignment may be limited in some PRB in the narrow band, and 5 (1*5*1) or 6 (1*6*1) or 7 (1*7*1) states are required to indicate resource information of different subcarrier RUs (the resource information refers to the type of the subcarrier RU, and the number of subcarrier RUs is fixed at 1), as shown in Table 29, Table 30, Table 31 or Table 32 and Table 33. A serial number of a PRB supporting the resource assignment of the subcarrier RU is pre-defined or indicated via RRC signaling (a system message or user-specific RRC signaling).

TABLE 29

| 4-bit resource assignment domain in the narrow band | Assigned PRB resource or subcarrier RU |
|---|---|
| 0000 | PRB #0 |
| 0001 | PRB #1 |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | 3-subcarrier RU Subcarrier {#0, #1, #2} in PRB #j |
| 1001 | 3-subcarrier RU Subcarrier {#3, #4, #5} in PRB #j |
| 1010 | 3-subcarrier RU Subcarrier {#6, #7, #8} in PRB #j |
| 1011 | 3-subcarrier RU Subcarrier {#9, #10, #11} in PRB #j |
| 1100 | 6-subcarrier RU Subcarrier {#0, #1, #2, #3, #4, #5} in PRB #j |
| 1101 | 6-subcarrier RU Subcarrier {#6, #7, #8, #9, #10, #11} in PRB #j |
| 1110-1111 | Reserved |

Note:
the j is pre-defined or configured via RRC signaling; and the j is selected from {0, 1, 2, 3, 4, 5} or a subset of {0, 1, 2, 3, 4, 5}.

TABLE 30

| 4-bit resource assignment domain in the narrow band | Assigned PRB resource or subcarrier RU |
|---|---|
| 0000 | PRB #0 |
| 0001 | PRB #1 |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | 4-subcarrier RU Subcarrier {#0, #1, #2, #3} in PRB #j |
| 1001 | 4-subcarrier RU Subcarrier {#4, #5, #6, #7} in PRB #j |
| 1010 | 4-subcarrier RU Subcarrier {#8, #9, #10, #11} in PRB #j |
| 1011 | 6-subcarrier RU Subcarrier {#0, #1, #2, #3, #4, #5} in PRB #j |
| 1100 | 6-subcarrier RU Subcarrier {#6, #7, #8, #9, #10, #11} in PRB #j |
| 1101 | 6-subcarrier RU Subcarrier {#3, #4, #5, #6, #7, #8} in PRB #j |
| 1110-1111 | Reserved |

Note:
the j in Table 30 is pre-defined or configured via RRC signaling. The j is selected from {0, 1, 2, 3, 4, 5} or a subset of {0, 1, 2, 3, 4, 5}.

TABLE 31

| 4-bit resource assignment domain in the narrow band | Assigned PRB resource or subcarrier RU |
|---|---|
| 0000 | PRB #0 |
| 0001 | PRB #1 |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | 4-subcarrier RU Subcarrier {#0, #1, #2, #3} in PRB #j |
| 1001 | 4-subcarrier RU Subcarrier {#4, #5, #6, #7} in PRB #j |
| 1010 | 4-subcarrier RU Subcarrier {#8, #9, #10, #11} in PRB #j |
| 1011 | 6-subcarrier RU Subcarrier {#0, #1, #2, #3, #4, #5} in PRB #j |
| 1100 | 6-subcarrier RU Subcarrier {#6, #7, #8, #9, #10, #11} in PRB #j |
| 1101-1111 | Reserved |

Note:
the j is pre-defined or configured via RRC signaling. The j is selected from {0, 1, 2, 3, 4, 5} or a subset of {0, 1, 2, 3, 4, 5}.

TABLE 32

| 4-bit resource assignment domain in the narrow band | Assigned PRB resource or subcarrier RU |
|---|---|
| 0000 | PRB #0 |
| 0001 | PRB #1 |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | 3-subcarrier RU Subcarrier {#0, #1, #2} in PRB #j |
| 1001 | 3-subcarrier RU Subcarrier {#3, #4, #5} in PRB #j |
| 1010 | 3-subcarrier RU Subcarrier {#6, #7, #8} in PRB #j |
| 1011 | 3-subcarrier RU Subcarrier {#9, #10, #11} in PRB #j |
| 1100 | 6-subcarrier RU Subcarrier {#0, #1, #2, #3, #4, #5} in PRB #j |
| 1101 | 6-subcarrier RU Subcarrier {#6, #7, #8, #9, #10, #11} in PRB #j |
| 1110 | 6-subcarrier RU Subcarrier {#3, #4, #5, #6, #7, #8} in PRB #j |
| 1111 | Reserved |

Note:
the j is pre-defined or configured via RRC signaling. The j is selected from {0, 1, 2, 3, 4, 5} or a subset of {0, 1, 2, 3, 4, 5}.

TABLE 33

| 4-bit resource assignment domain in the narrow band | Assigned PRB resource or subcarrier RU |
|---|---|
| 0000 | PRB #0 |
| 0001 | PRB #1 |
| 0010 | PRB #2 |
| 0011 | PRB #3 |
| 0100 | PRB #4 |
| 0101 | PRB #5 |
| 0110 | PRB #0, #1 |
| 0111 | PRB #2, #3 |
| 1000 | 3-subcarrier RU Subcarrier {#0, #1, #2} in PRB #j |
| 1001 | 3-subcarrier RU Subcarrier {#3, #4, #5} in PRB #j |
| 1010 | 3-subcarrier RU Subcarrier {#6, #7, #8} in PRB #j |
| 1011 | 3-subcarrier RU Subcarrier {#9, #10, #11} in PRB #j |
| 1100 | 4-subcarrier RU Subcarrier {#0, #1, #2, #3} in PRB #j |
| 1101 | 4-subcarrier RU Subcarrier {#4, #5, #6, #7} in PRB #j |

TABLE 33-continued

| 4-bit resource assignment domain in the narrow band | Assigned PRB resource or subcarrier RU |
|---|---|
| 1110 | 4-subcarrier RU Subcarrier {#8, #9, #10, #11} in PRB #j |
| 1111 | Reserved |

Note:
the j is pre-defined or configured via RRC signaling. The j is selected from {0, 1, 2, 3, 4, 5} or a subset of {0, 1, 2, 3, 4, 5}.

By using a 4-bit resource assignment domain in the narrow band, this embodiment may indicate the resource assignment at the PRB level in the narrow band (any one PRB or PRB #0, #1 or PRB #2, #3 is assigned in the narrow band) and the resource assignment of 5 or 6 or 7 types of subcarrier RUs that have the maximum number of RUs of 1 in the specified PRB and are shown in Table 1/Table 2/Table 3 or Table 4/Table 5.

Exemplary Embodiment 18

This embodiment describes solving a problem of joint resource assignment at a PRB resource assignment granularity and a Sub-PRB resource assignment granularity in a CE mode B.

A resource assignment field having a length of 3 bits in a narrow band is used to indicate the resource assignment at the PRB level resource assignment granularity and the Sub-PRB level resource assignment granularity in the narrow band, so as to support the resource assignment of 1 PRB on a specified part and the resource assignment of a specified part including 2 continuous PRBs (PRB #0, #1 or PRB #2, #3) in the narrow band as well as the resource assignment of a subcarrier RU in some specified PRB in the narrow band. As shown in Table 8, there are 3-subcarrier RU, and 4 types of subcarrier RUs are supported in total. The maximum number of subcarrier RUs for the 3-subcarrier RU is 1. The 3 bits indicate 8 states in total, 4 states of which are used for indicating the PRB RU (any one in 3 specified PRB resources or one specified PRB in PRB #0, #1 or PRB #, #3) assigned according to the PRB level resource assignment granularity in the narrow band. When the 3 bits indicate the resource assignment of the subcarrier RU, the resource assignment may be limited in some PRB in the narrow band, and 4 states are required to indicate the types of the different subcarrier RUs, as shown in Table 34. A serial number of a PRB supporting the resource assignment of the subcarrier RU is pre-defined or indicated via RRC signaling (a system message or user-specific RRC signaling). The PRB resource and the PRB group resource capable of performing the resource assignment at the PRB level are pre-defined or indicated via RRC signaling (the system message or the user-specific RRC signaling).

TABLE 34

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB # (2*l), #(2*i + 1) |
| 100 | Subcarrier #0, #1, #2 in PRB #j |

TABLE 34-continued

| 3-bit resource assignment domain in the narrow band | Assigned PRB resource or subcarrier RU |
|---|---|
| 101 | Subcarrier #3, #4, #5 in PRB #j |
| 110 | Subcarrier #6, #7, #8 in PRB #j |
| 111 | Subcarrier #9, #10, #11 in PRB #j |

Note:
the i and the j are pre-defined or configured via RRC signaling; the i is equal to 0 or 1; and the j is selected from {0, 1, 2, 3, 4, 5} or a subset of {0, 1, 2, 3, 4, 5}.

By using a 3-bit resource assignment domain in the narrow band, this embodiment may indicate the resource assignment at the PRB level in the narrow band (a part of 1 PRB or PRB groups are assigned in the narrow band (one specified in #0, #1 or PRB #2, #3)) and the resource assignment of 4 types of subcarrier RUs that have the maximum number of RUs of 1 in the specified PRB and are shown in Table 8.

Exemplary Embodiment 19

This embodiment describes solving a problem of joint resource assignment at a PRB resource assignment granularity and a Sub-PRB resource assignment granularity in a CE mode B.

A resource assignment field having a length of 3 bits in a narrow band is used to indicate the resource assignment at the PRB level resource assignment granularity and the Sub-PRB level resource assignment granularity in the narrow band, so as to support the resource assignment of 1 PRB or 2 continuous PRBs on a specified part on in the narrow band (PRB #0, #1 or PRB #2, #3) as well as the resource assignment of a subcarrier RU in some specified PRB in the narrow band. As shown in Table 6 or Table 7, there are 6-subcarrier RU or 4-subcarrier RU, and 2 or 3 types of subcarrier RUs are supported in total. The maximum number of subcarrier RUs for the 6-subcarrier RU or 4-subcarrier RU is 1. The 3 bits indicate 8 states in total, 4 states of which are used for indicating the PRB RU (any one in 3 specified PRB resources or any one in PRB #0, #1 or PRB #2, #3) assigned according to the PRB level resource assignment granularity in the narrow band. When the 3 bits indicate the resource assignment of the subcarrier RU, the resource assignment may be limited in some PRB in the narrow band, and 2 or 3 states are required to indicate the types of the different subcarrier RUs, as shown in Table 35 and Table 36. A serial number of a PRB supporting the resource assignment of the subcarrier RU is pre-defined or indicated via RRC signaling (a system message or user-specific RRC signaling). The PRB resource and the PRB group resource capable of performing the resource assignment at the PRB level are pre-defined or indicated via RRC signaling (the system message or the user-specific RRC signaling).

TABLE 35

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB #0, #1 |

TABLE 35-continued

| 3-bit resource assignment domain in the narrow band | Assigned PRB resource or subcarrier RU |
|---|---|
| 100 | PRB #2, #3 |
| 101 | Subcarrier #0, #1, #2, #3, #4, #5 in PRB #j |
| 110 | Subcarrier #6, #7, #8, #9, #10, #11 in PRB #j |
| 111 | Reserved |

Note:
the i and the j are pre-defined or configured via RRC signaling; the i is equal to 0 or 1; and the j is selected from {0, 1, 2, 3, 4, 5} or a subset of {0, 1, 2, 3, 4, 5}.

TABLE 36

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB #0, #1 |
| 100 | PRB #2, #3 |
| 101 | Subcarrier #0, #1, #2, #3 in PRB #j |
| 110 | Subcarrier #4, #5, #6, #7 in PRB #j |
| 111 | Subcarrier #8, #9, #10, #11 in PRB #j |

Note:
the i and the j are pre-defined or configured via RRC signaling; the i is equal io 0 or 1; and the j is selected from {0, 1, 2, 3, 4, 5} or a subset of {0, 1, 2, 3, 4, 5}.

By using a 3-bit resource assignment domain in the narrow band, this embodiment may indicate the resource assignment at the PRB level in the narrow band (a part of 1 PRB or PRB groups are assigned in the narrow band (any one in #0, #1 or PRB #2, #3)) and the resource assignment of 2 or 3 types of subcarrier RUs that have the maximum number of RUs of 1 in the specified PRB and are shown in Table 6/Table 7.

Exemplary Embodiment 20

This embodiment describes solving a problem of joint resource assignment at a PRB resource assignment granularity and a Sub-PRB resource assignment granularity in a CE mode B.

A resource assignment field having a length of 3 bits in a narrow band is used to indicate the resource assignment at the PRB level resource assignment granularity and the Sub-PRB level resource assignment granularity in the narrow band, so as to support the resource assignment of 1 PRB on a specified part and specified one part including 2 continuous PRBs in the narrow band (PRB #0, #1 or PRB #2, #3) as well as the resource assignment of a subcarrier RU in some specified PRB in the narrow band. As shown in Table 8 or Table 6/Table 7, there are 3-subcarrier RU and/or 4-subcarrier RU and/or 6-subcarrier RU, and 4 or 3 or 2 types of subcarrier RUs are supported in total. The maximum number of subcarrier RUs for the 3-subcarrier RU or 6-subcarrier RU is 1. The 3 bits indicate 8 states in total, 4 states of which are used for indicating the PRB RU (any one in 3 specified PRB resources or specified one in PRB #0, #1 or PRB #2, #3) assigned according to the PRB level resource assignment granularity in the narrow band. When the 3 bits indicate the resource assignment of the subcarrier RU, the resource assignment may be limited in some PRB in the narrow band, and 4 states are required to indicate the types of the different subcarrier RUs, as shown in Table 37, Table 38 and Table 39. A serial number of a PRB supporting the resource assignment of the subcarrier RU is pre-defined or indicated via RRC signaling (a system message or user-specific RRC signaling). The PRB resource and the PRB group resource capable of performing the resource assignment at the PRB level are pre-defined or indicated via RRC signaling (the system message or the user-specific RRC signaling). Whether the type of the subcarrier RU is 3-subcarrier RU or 4-subcarrier RU or 6-subcarrier RU is pre-defined or indicated by RRC signaling.

TABLE 37

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB #(2*i), #(2*i + 1) |
| 100 | Subcarrier #0, #1, #2 in PRB #j |
| 101 | Subcarrier #3, #4, #5 in PRB #j |
| 110 | Subcarrier #6, #7, #8 in PRB #j |
| 111 | Subcarrier #9, #10, #11 in PRB #j |

Note:
the i and the j are pre-defined or configured via RRC signaling; the i is equal to 0 or 1; and the j is selected from {0, 1, 2, 3, 4, 5} or a subset of {0, 1, 2, 3, 4, 5}.

TABLE 38

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB #(2*i), #(2*i + 1) |
| 100 | Subcarrier #0, #1, #2, #3, #4, #5 in PRB #j |
| 101 | Subcarrier #6, #7, #8, #9, #10, #11 in PRB #j |
| 110-111 | Reserved |

Note:
the i and the j are pre-defined or configured via RRC signaling; the i is equal to 0 or 1; and the j is selected from {0, 1, 2, 3, 4, 5} or a subset of {0, 1, 2, 3, 4, 5}.

TABLE 39

| 3-bit resource assignment domain in the narrow band | Assigned PRB resource or subcarrier RU |
|---|---|
| 000 | PRB # (3*i) |
| 001 | PRB # (3*i + 1) |
| 010 | PRB # (3*i + 2) |
| 011 | PRB #(2*i), #(2*i + 1) |
| 100 | Subcarrier #0, #1, #2, #3 in PRB #j |
| 101 | Subcarrier #4, #5, #6, #7 in PRB #j |
| 110 | Subcarrier #8, #9, #10, #11 in PRB #j |
| 111 | Reserved |

Note:
the i and the j are pre-defined or configured via RRC signaling; the i is equal to 0 or 1; and the j is selected from {0, 1, 2, 3, 4, 5} or a subset of {0, 1, 2, 3, 4, 5}.

By using a 3-bit resource assignment domain in the narrow band, this embodiment may indicate the resource assignment at the PRB level in the narrow band (a part of 1 PRB or PRB groups are assigned in the narrow band (specified one in #0, #1 or PRB #2, #3)) and the resource assignment of 4 or 3 or 2 types of subcarrier RUs that have the maximum number of RUs of 1 in the specified PRB and are shown in Table 8 or Table 6/Table 7.

Exemplary Embodiment 21

A method for implementing resource assignment on an MTC terminal Msg3 provided by this embodiment specifically includes one of the following features.

1. For a RAR scheduling Msg3 message, a traditional PRB level resource assignment solution is used.

2. For retransmission of the Msg3 message, the resource assignment solution is determined according to different types of random access processes.

In case of a competitive random access process, for retransmission of the UL grant scheduling Msg3, a traditional PRB level resource assignment solution is used in the DCI.

In case of a non-competitive random access process, for retransmission of the UL grant scheduling Msg3, if the Sub-PRB assignment is enabled, a resource assignment domain for the Sub-PRB assignment is used in the DC to indicate whether the resource assignment is at the PRB level or at the Sub-PRB level.

Those skilled in the art can understand that the modules or operations of the present disclosure may be implemented by a general-purpose computing device and centralized in a single computing device or distributed over a network consisting of a plurality of computing devices. In some exemplary implementation, they may be implemented by a program code executable by a computing device, so that they may be stored in a storage device and executed by the computing device. Moreover, they may be different from the operations illustrated or described herein in some cases, or implemented by respectively fabricating them into respective integrated circuit modules or by fabricating a plurality of modules or operations of them into a single integrated circuit module. By doing so, the present disclosure is not limited to any specific combination of hardware and software.

The above descriptions are only exemplary embodiments of the present disclosure and are not intended to limit the present disclosure. For the person skilled in the art, the present disclosure may have various modifications and changes. Any modification, equivalent replacement, improvement and the like made within a principle of the present disclosure should be included in a protection scope of the present disclosure.

What is claimed is:

1. A resource determination method, comprising:

receiving configuration information, the configuration information carrying indication information for indicating information of a Physical Resource Block (PRB) that supports resource assignment for a terminal with a subcarrier Resource Unit (RU) as a minimum granularity;

receiving information carrying a resource assignment field, a Resource Indication Value (RIV) of a specified field in the resource assignment field being used for indicating resource information assigned to the terminal; and determining, according to the indication information and the RIV, a resource assigned to the terminal, wherein in a case where the minimum granularity of the resource assigned to the terminal is the subcarrier RU, the RIV comprises one of the following:

index value for a type of the subcarrier RU+index value of the PRB*total number of states for the type of the subcarrier RU+index value for the number of subcarrier RUs* total number of states for the index value of the PRB*total number of states for the type of the subcarrier RU;

index value for a type of the subcarrier RU+index value for the number of subcarrier RUs* total number of states for the type of the subcarrier RU+index value of the PRB*total number of states for a number index of the subcarrier RU*total number of states for the type of the subcarrier RU;

index value of the PRB+index for the type of the subcarrier RU*total number of states for the index value of the PRB+index value for the number of subcarrier RUs*total number of states for the index value of the PRB*total number of states of the index for the type of the subcarrier RU;

index value of the PRB+index value for the number of subcarrier RUs*total number of states for the index value of the PRB+index value for a type of the subcarrier RU*total number of states for the index value of the PRB*total number of states of the index for the number of subcarrier RUs;

index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

index value for the number of subcarrier RUs+index value of the PRB*total number of states for the number of subcarrier RUs+index value for a type of the subcarrier RU*total number of states for the number of subcarrier RUs*total number of states for the index value of the PRB;

Q+index value for a type of the subcarrier RU+index value of the PRB*total number of states for the type of the subcarrier RU+index value for the number of subcarrier RUs*total number of states for the index value of the PRB*total number of states for the type of the subcarrier RU;

Q+index value of the PRB+index for the type of the subcarrier RU*total number of states for the index of the subcarrier RU+index value for the number of subcarrier RUs*total number of states for the index value of the PRB*total number of states of the index for the type of the subcarrier RU;

Q+index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

Q+index value for a type of the subcarrier RU+index value for the number of subcarrier RUs*total number of states for the type of subcarrier RU+index value of the PRB*total number of states of the index for the number of subcarrier RUs*total number of states for the type of the subcarrier RU; Q+index value of the PRB+index value for the number of subcarrier RUs*total number of states for the index value of the PRB+index value for a type of the subcarrier RU*total number of states for the index value of the PRB*total number of states of the index for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and the Q is a positive integer.

2. The method as claimed in claim 1, wherein the specified field has a length of X bits, wherein in case of a Coverage Enhanced (CE) mode A, the X is one of the followings: 2, 3, 4, 5, 6, 7 and 8; and in case of a CE mode B, the X is one of the followings: 1, 2, 3, 4, 5 and 6.

3. The method as claimed in claim 2, wherein the X meets the following condition:

$$M+N \times P \times S \leq 2X,$$

where the M denotes a number of resource assignment types under which resources are assigned to the terminal with the PRB as the minimum granularity, the N denotes a number of PRBs that support resource assignment for the terminal with the subcarrier RU as the minimum granularity, the P denotes a number of types of subcarrier RUs, and the S denotes a number of types for the number of subcarrier RUs.

4. The method as claimed in claim 1, wherein when the RIV falls into a second domain, the resource information comprises at least one of the followings: a PRB where the subcarrier RU assigned to the terminal is located, a type of the subcarrier RU assigned to the terminal, and a number of subcarrier RUs under the type of the subcarrier RU assigned to the terminal.

5. The method as claimed in claim 1, wherein the information of the PRB that supports the resource assignment with the subcarrier RU as the minimum granularity is configured via Radio Resource Control (RRC) signaling.

6. The method as claimed in claim 1, wherein the information of the PRB that supports the resource assignment with the subcarrier RU as the minimum granularity is a serial number of a physical resource element in a narrow band.

7. An information sending method, comprising:

sending, by the network device, configuration information to a terminal, the configuration information carrying indication information for indicating information of a Physical Resource Block (PRB) that supports resource assignment for the terminal with a subcarrier Resource Unit (RU) as a minimum granularity; and sending, by the network device, information carrying a resource assignment field to the terminal, a Resource Indication Value (RIV) of a specified field in the resource assignment field being used for indicating resource information assigned to the terminal, so as to the terminal determines a resource assigned to the terminal according to the indication information and information carrying a resource assignment field, wherein in a case where the minimum granularity of the resource assigned to the terminal is the subcarrier RU, the RIV comprises one of the following:

index value for a type of the subcarrier RU+index value of the PRB*total number of states for the type of the subcarrier RU+index value for the number of subcarrier RUs*total number of states for the index value of the PRB*total number of states for the type of the subcarrier RU;

index value for a type of the subcarrier RU+index value for the number of subcarrier RUs*total number of states for the type of the subcarrier RU+index value of the PRB*total number of states for a number index of the subcarrier RU*total number of states for the type of the subcarrier RU;

index value of the PRB+index for the type of the subcarrier RU*total number of states for the index value of the PRB+index value for the number of subcarrier RUs*total number of states for the index value of the PRB*total number of states of the index for the type of the subcarrier RU;

index value of the PRB+index value for the number of subcarrier RUs*total number of states for the index value of the PRB+index value for a type of the subcarrier RU*total number of states for the index value of the PRB*total number of states of the index for the number of subcarrier RUs;

index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

index value for the number of subcarrier RUs+index value of the PRB*total number of states for the number of subcarrier RUs+index value for a type of the subcarrier RU*total number of states for the number of subcarrier RUs*total number of states for the index value of the PRB;

Q+index value for a type of the subcarrier RU+index value of the PRB*total number of states for the type of the subcarrier RU+index value for the number of subcarrier RUs*total number of states for the index value of the PRB*total number of states for the type of the subcarrier RU;

Q+index value of the PRB+index for the type of the subcarrier RU*total number of states for the index of the subcarrier RU+index value for the number of subcarrier RUs*total number of states for the index value of the PRB*total number of states of the index for the type of the subcarrier RU;

Q+index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

Q+index value for a type of the subcarrier RU+index value for the number of subcarrier RUs*total number of states for the type of subcarrier RU+index value of the PRB*total number of states of the index for the number of subcarrier RUs*total number of states for the type of the subcarrier RU;

Q+index value of the PRB+index value for the number of subcarrier RUs*total number of states for the index value of the PRB+index value for a type of the subcarrier RU*total number of states for the index value of the PRB*total number of states of the index for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and the Q is a positive integer.

8. The method as claimed in claim 7, wherein the specified field has a length of X bits, wherein in case of a Coverage Enhanced (CE) mode A, the X is one of the followings: 2, 3, 4, 5, 6, 7 and 8; and in case of a CE mode B, the X is one of the followings: 1, 2, 3, 4, 5 and 6.

9. The method as claimed in claim 8, wherein the X meets the following condition:

$$M+N\times P\times S\leq 2\times,$$

where the M denotes a number of resource assignment types under which resources are assigned to the terminal with the PRB as the minimum granularity, the N denotes a number of PRBs that support resource assignment for the terminal with the subcarrier RU as the minimum granularity, the P denotes a number of types of subcarrier RUs, and the S denotes a number of types for the number of subcarrier RUs.

10. The method as claimed in claim 7, wherein when the RIV falls into a second domain, the resource information comprises at least one of the followings: a PRB where the subcarrier RU assigned to the terminal is located, a type of the subcarrier RU assigned to the terminal, and a number of subcarrier RUs under the type of the subcarrier RU assigned to the terminal.

11. The method as claimed in claim 7, wherein the information of the PRB that supports the resource assignment with the subcarrier RU as the minimum granularity is configured via Radio Resource Control (RRC) signaling.

12. The method as claimed in claim 7, wherein the information of the PRB that supports the resource assignment with the subcarrier RU as the minimum granularity is a serial number of a physical resource element in a narrow band.

13. A resource determination device, comprising:
a receiving module, configured to receive configuration information, the configuration information carrying indication information for indicating information of a Physical Resource Block (PRB) that supports resource assignment for a terminal with a subcarrier RU as a minimum granularity; and further configured to receive information carrying a resource assignment field, a Resource Indication Value (RIV) of a specified field in the resource assignment field being used for indicating resource information assigned to the terminal; and
a determination module, configured to determine, according to the indication information and the RIV, a resource assigned to the terminal, wherein
when the RIV of the specified field falls into a first domain, the minimum granularity of the resource assigned to the terminal is the PRB; and
when the RIV of the specified field falls into a second domain, the minimum granularity of the resource assigned to the terminal is the subcarrier RU, wherein in a case where the minimum granularity of the resource assigned to the terminal is the subcarrier RU, the RIV comprises one of the following:
index value for a type of the subcarrier RU+index value of the PRB*total number of states for the type of the subcarrier RU+index value for the number of subcarrier RUs*total number of states for the index value of the PRB*total number of states for the type of the subcarrier RU;
index value for a type of the subcarrier RU+index value for the number of subcarrier RUs*total number of states for the type of the subcarrier RU+index value of the PRB*total number of states for a number index of the subcarrier RU*total number of states for the type of the subcarrier RU;
index value of the PRB+index for the type of the subcarrier RU*total number of states for the index value of the PRB+index value for the number of subcarrier RUs*total number of states for the index value of the PRB*total number of states of the index for the type of the subcarrier RU;
index value of the PRB+index value for the number of subcarrier RUs*total number of states for the index value of the PRB+index value for a type of the subcarrier RU*total number of states for the index value of the PRB*total number of states of the index for the number of subcarrier RUs;
index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;
index value for the number of subcarrier RUs+index value of the PRB*total number of states for the number of subcarrier RUs+index value for a type of the subcarrier RU*total number of states for the number of subcarrier RUs*total number of states for the index value of the PRB;
Q+index value for a type of the subcarrier RU+index value of the PRB*total number of states for the type of the subcarrier RU+index value for the number of subcarrier RUs*total number of states for the index value of the PRB*total number of states for the type of the subcarrier RU;
Q+index value of the PRB+index for the type of the subcarrier RU*total number of states for the index of the subcarrier RU+index value for the number of subcarrier RUs*total number of states for the index value of the PRB*total number of states of the index for the type of the subcarrier RU;
Q+index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;
Q+index value for a type of the subcarrier RU+index value for the number of subcarrier RUs*total number of states for the type of subcarrier RU+index value of the PRB*total number of states of the index for the number of subcarrier RUs*total number of states for the type of the subcarrier RU;
Q+index value of the PRB+index value for the number of subcarrier RUs*total number of states for the index value of the PRB+index value for a type of the subcarrier RU*total number of states for the index value of the PRB*total number of states of the index for the number of subcarrier RUs; and
Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and
the Q is a positive integer.

14. An information sending device, comprising:
a sending module, configured to send configuration information to a terminal, the configuration information carrying indication information for indicating information of a Physical Resource Block (PRB) that supports resource assignment for the terminal with a subcarrier RU as a minimum granularity; and further configured to send information carrying a resource assignment field to the terminal, a Resource Indication Value (RIV)

of a specified field in the resource assignment field being used for indicating resource information assigned to the terminal, so as to the terminal determines a resource assigned to the terminal according to the indication information and information carrying a resource assignment field, wherein when the RIV of the specified field falls into a first domain, the minimum granularity of the resource assigned to the terminal is the PRB; and when the RIV of the specified field falls into a second domain, the minimum granularity of the resource assigned to the terminal is the subcarrier RU, wherein in a case where the minimum granularity of the resource assigned to the terminal is the subcarrier RU, the RIV comprises one of the following:

index value for a type of the subcarrier RU+index value of the PRB*total number of states for the type of the subcarrier RU+index value for the number of subcarrier RUs*total number of states for the index value of the PRB*total number of states for the type of the subcarrier RU;

index value for a type of the subcarrier RU+index value for the number of subcarrier RUs*total number of states for the type of the subcarrier RU+index value of the PRB*total number of states for a number index of the subcarrier RU*total number of states for the type of the subcarrier RU;

index value of the PRB+index for the type of the subcarrier RU*total number of states for the index value of the PRB+index value for the number of subcarrier RUs*total number of states for the index value of the PRB*total number of states of the index for the type of the subcarrier RU;

index value of the PRB+index value for the number of subcarrier RUs*total number of states for the index value of the PRB+index value for a type of the subcarrier RU*total number of states for the index value of the PRB*total number of states of the index for the number of subcarrier RUs;

index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

index value for the number of subcarrier RUs+index value of the PRB*total number of states for the number of subcarrier RUs+index value for a type of the subcarrier RU*total number of states for the number of subcarrier RUs*total number of states for the index value of the PRB;

Q+index value for a type of the subcarrier RU+index value of the PRB*total number of states for the type of the subcarrier RU+index value for the number of subcarrier RUs*total number of states for the index value of the PRB*total number of states for the type of the subcarrier RU;

Q+index value of the PRB+index for the type of the subcarrier RU*total number of states for the index of the subcarrier RU+index value for the number of subcarrier RUs*total number of states for the index value of the PRB*total number of states of the index for the type of the subcarrier RU;

Q+index value for the number of subcarrier RUs+index value for a type of the subcarrier RU*total number of states for the number of subcarrier RUs+index value of the PRB*total number of states for the number of subcarrier RUs*total number of states of the index for the type of the subcarrier RU;

Q+index value for a type of the subcarrier RU+index value for the number of subcarrier RUs*total number of states for the type of subcarrier RU+index value of the PRB*total number of states of the index for the number of subcarrier RUs*total number of states for the type of the subcarrier RU;

Q+index value of the PRB+index value for the number of subcarrier RUs*total number of states for the index value of the PRB+index value for a type of the subcarrier RU*total number of states for the index value of the PRB*total number of states of the index for the number of subcarrier RUs; and Q+index value for the number of subcarrier RUs+index value of the PRB*total number of states for the number of subcarrier RUs+index value for a type of the subcarrier RU*total number of states for the number of subcarrier RUs*total number of states for the index value of the PRB; and the Q is a positive integer.

* * * * *